(12) United States Patent
Osawa et al.

(10) Patent No.: US 12,411,109 B2
(45) Date of Patent: Sep. 9, 2025

(54) CAPILLARY ELECTROPHORESIS DEVICE

(71) Applicant: HITACHI HIGH-TECH CORPORATION, Tokyo (JP)

(72) Inventors: Kentaro Osawa, Tokyo (JP); Takashi Anazawa, Tokyo (JP); Manabu Shiozawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 374 days.

(21) Appl. No.: 18/018,174

(22) PCT Filed: Aug. 13, 2020

(86) PCT No.: PCT/JP2020/030789
§ 371 (c)(1),
(2) Date: Jan. 26, 2023

(87) PCT Pub. No.: WO2022/034670
PCT Pub. Date: Feb. 17, 2022

(65) Prior Publication Data
US 2023/0266271 A1 Aug. 24, 2023

(51) Int. Cl.
*G01N 27/447* (2006.01)
(52) U.S. Cl.
CPC .. *G01N 27/44782* (2013.01); *G01N 27/44721* (2013.01); *G01N 27/44743* (2013.01)
(58) Field of Classification Search
CPC ....... G01N 27/44782; G01N 27/44721; G01N 27/44743; G01N 27/44791; G01N 30/74
See application file for complete search history.

(56) References Cited

U.S. PATENT DOCUMENTS 5,312,535 A * 5/1994 Waska ............. G01N 27/44721
204/603
5,516,409 A * 5/1996 Kambara ......... G01N 27/44782
204/603
(Continued)

FOREIGN PATENT DOCUMENTS

CN 202770772 U 3/2013
CN 106018403 A 10/2016
(Continued)

OTHER PUBLICATIONS

EPO machine generated translation of Mahe Liu CN106018403A, patent published Oct. 12, 2016 (Year: 2016).*
(Continued)

*Primary Examiner* — Alexander S Noguerola
(74) *Attorney, Agent, or Firm* — MATTINGLY & MALUR, PC

(57) ABSTRACT

A capillary electrophoresis device includes: a plurality of capillaries; a light source; a detector that detects light transmitted through the capillaries; an optical coupling optical system and a plurality of first optical fibers provided between the light source and the plurality of capillaries; and a plurality of second optical fibers provided between the plurality of capillaries and the detector. The optical coupling optical system couples the light from the light source to the plurality of first optical fibers. Each of the plurality of first optical fibers has a first end face connected to the optical coupling optical system, and a second end face arranged close to and opposite to a corresponding capillary among the capillaries. Each of the plurality of second optical fibers has a first end face arranged close to and opposite to a corresponding capillary among the capillaries, and a second end face connected to the detector.

12 Claims, 15 Drawing Sheets

(56) References Cited

U.S. PATENT DOCUMENTS

| | | | | |
|---|---|---|---|---|
| 5,790,727 | A | * | 8/1998 | Dhadwal .................. G02B 6/26 |
| | | | | 385/115 |
| 8,961,764 | B2 | * | 2/2015 | Trost .................... G01N 21/645 |
| | | | | 204/603 |
| 2018/0321189 | A1 | | 11/2018 | Roach et al. |
| 2021/0262980 | A1 | * | 8/2021 | Takahashi ........ G01N 27/44756 |

FOREIGN PATENT DOCUMENTS

| | | |
|---|---|---|
| JP | 09-288089 A | 11/1997 |
| JP | 2019504989 A | 2/2019 |
| WO | 2019244358 A1 | 7/2021 |

OTHER PUBLICATIONS

EPO machine generated translation of CN 202770772 U, patent published Mar. 6, 2013 (Year: 2013).*
EPO machine generated translation of JP H09-288089A, patent published Nov. 4, 1997 (Year: 1997).*
International Search Report of PCT/JP2020/030789 dated Oct. 13, 2020.

* cited by examiner

FIG. 8A $\quad -\frac{2NA}{\sqrt{1-NA^2}}\left(d_1+\frac{R_{out}}{2}\right)+\frac{R_{in}}{\sqrt{1-NA^2}} > c_0$
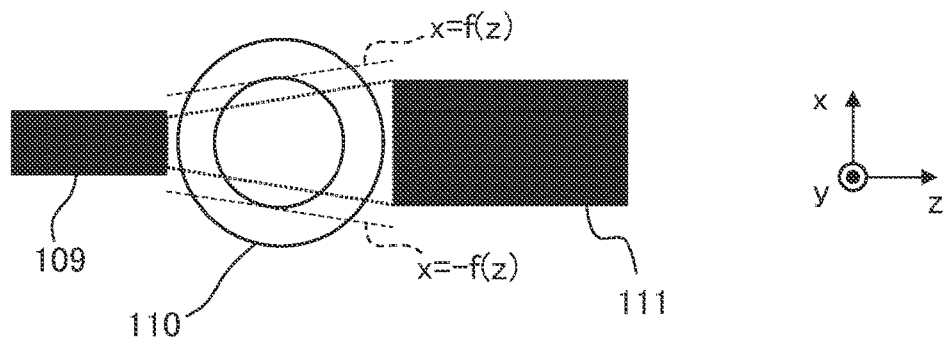
FIG. 8B $\quad -c_0 \leq -\frac{2NA}{\sqrt{1-NA^2}}\left(d_1+\frac{R_{out}}{2}\right)+\frac{R_{in}}{\sqrt{1-NA^2}} \leq c_0$
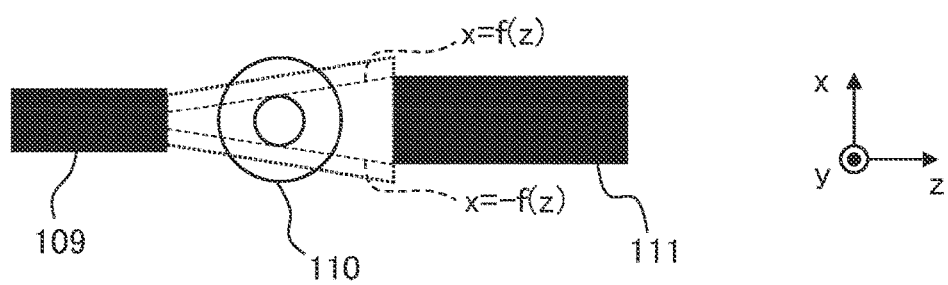
FIG. 8C $\quad -\frac{2NA}{\sqrt{1-NA^2}}\left(d_1+\frac{R_{out}}{2}\right)+\frac{R_{in}}{\sqrt{1-NA^2}} < -c_0$
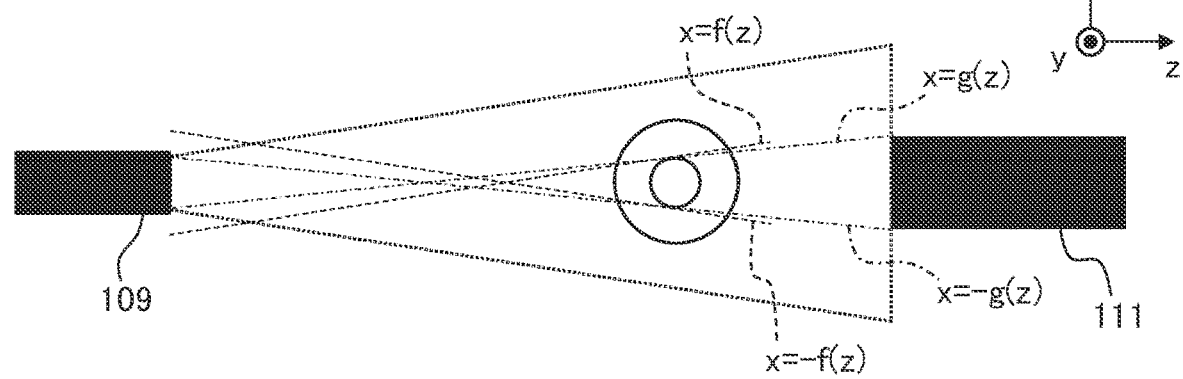

CAPILLARY ELECTROPHORESIS DEVICE

TECHNICAL FIELD

The present invention relates to a capillary electrophoresis device.

BACKGROUND ART

Biopharmaceutical drugs have excellent action that an antibody molecule modified with a sugar chain exerts an effect on a specific target such as cancer or rare and intractable diseases, which is not found in small molecule drugs. The small molecule pharmaceuticals are synthesized by chemical reactions, whereas biopharmaceutical drugs are generated utilizing biological functions of cells, and thus, molecular structures of products are affected by slight changes in culture conditions. Immunoglobulin G (IgG), a representative biopharmaceutical drug is a large molecule having a complicated structure and a molecular weight of about 150,000, and it is almost impossible to prevent structural heterogeneity. Therefore, quality inspection techniques for confirming the safety and efficacy of preparations in biopharmaceutical drugs play an even more important role.

Since the structure of a target substance is complicated, test items of biopharmaceutical drugs are diverse. A capillary electrophoresis device is used as an inspection of the biopharmaceutical drugs, for example, in a confirmation test for confirming that a main component contained in an object to be inspected is a target substance, a purity test for evaluating the content of impurities, and the like.

In a capillary electrophoresis device, a sample such as an antibody is injected into a capillary and electrophoresed, so that the sample is separated according to a molecular weight and the amount of charge, and is detected by a detection unit provided near a capillary terminal. As detection schemes, optical schemes such as ultraviolet (UV) absorption, native fluorescence (NF), and laser-induced fluorescence (LIF) are widely used.

Among them, UV absorption measurement is the most widely used detection scheme. Wavelengths often used for the JV absorption measurement are 280 nm which is easily absorbed by side chains of aromatic amino acids, 190 nm to 220 nm which are easily absorbed by peptide bonds, and the like. A deuterium lamp is generally used as a light source, and only a specific wavelength is cut out using a band-pass filter and used. A UV absorption measurement unit of a general capillary electrophoresis device is configured to form an image of a light emitting surface of the light source at a position of a capillary using a lens, irradiate the capillary with light, and detect light transmitted through the capillary. A detection sensitivity (minimum detectable sample concentration) is determined by parameters such as a light emission intensity distribution of the light source, stability of the light source, an imaging magnification, an inner diameter of the capillary, and noise of a detector. Capillary electrophoresis devices currently available in the market have a sensitivity of about 0.5 µg/mL in IgG.

Regarding such capillary electrophoresis devices, for example, PTL 1 discloses a predetermined system. The system includes: a housing; a cartridge retainer arranged within the housing, the cartridge retainer configured to receive a capillary cartridge having a capillary; and a detection assembly arranged within the housing, the detection assembly including at least one emitter, a first detector, and a second detector. Further, the system includes the detection assembly configured to transition between a first configuration in which the first detector detects a first output of the at least one emitter, and a second configuration in which the second detector detects a second output of the at least one emitter. Furthermore, the system also includes a reagent tray holder movably arranged in the housing, the reagent tray holder configured to move relative to the cartridge retainer to place the capillary of the capillary cartridge in fluid communication with a reagent volume.

CITATION LIST

Patent Literature

PTL 1: JP 2019-504989 A

SUMMARY OF INVENTION

Technical Problem

In capillary electrophoresis devices currently distributed on the market including the system disclosed in PTL 1, the number of capillaries is one, and thus, only one sample can be measured at a time. Since it takes a long time (typically about 30 minutes) to measure one sample, low throughput is a problem. A biopharmaceutical drug is developed through processes such as screening, structure optimization, and purification process optimization, and it is necessary to measure many samples (candidates for the biopharmaceutical drug) under different conditions in these processes. Furthermore, in general, measurement is performed three or more times for one condition in order to conform reproducibility. For this reason, there is a problem that a development period is prolonged due to the low throughput, and thus, there is a strong demand for improving throughput of an inspection device in the pharmaceutical field. Shortening the development period of a biopharmaceutical drug leads to early delivery of the biopharmaceutical drug to patients, and thus, is important from the viewpoint of not only profits but also social significance. Furthermore, there is a great need for high throughput of a capillary electrophoresis device not only in a development stage but also in a manufacturing process or quality inspection before product shipment.

The present invention has been made in view of the above circumstances, and an object thereof is to provide the capillary electrophoresis device with high throughput.

Solution to Problem

A capillary electrophoresis device according to the present invention that has solved the above problems includes: a plurality of capillaries into which samples to be measured are introduced and electrically separated; a light source that generates light for analyzing the samples electrically separated in the plurality of capillaries; and a detector that detects light transmitted through the capillaries. The capillary electrophoresis device includes an optical coupling optical system and a plurality of first optical fibers between the light source and the plurality of capillaries, and a plurality of second optical fibers between the plurality of capillaries and the detector. In this capillary electrophoresis device, the optical coupling optical system couples the light from the light source to the plurality of first optical fibers. In this capillary electrophoresis device, each of the plurality of first optical fibers has one end face connected to the optical coupling optical system and the other end face arranged close to and opposite to the corresponding capillary. Furthermore, in the capillary electrophoresis device, each of the plurality of second optical fibers has one end face arranged close to and opposite to the corresponding capillary and the other end face connected to the detector.

Advantageous Effects of Invention

According to the present invention, a capillary electrophoresis device with high throughput can be provided.

Other objects, configurations, and effects which have not been described above will become apparent from embodiments to be described hereinafter.

BRIEF DESCRIPTION OF DRAWINGS

FIG. 8A is a schematic view of the xz cross section illustrating a state where light emitted from the first optical fiber passes through the capillary and reaches the second optical fiber.

FIG. 8B is a schematic view of the xz cross section illustrating a state where light emitted from the first optical fiber passes through the capillary and reaches the second optical fiber.

FIG. 8C is a schematic view of the xz cross section illustrating a state where light emitted from the first optical fiber passes through the capillary and reaches the second optical fiber.

DESCRIPTION OF EMBODIMENTS

First Embodiment

Hereinafter, a capillary electrophoresis device according to an embodiment of the present invention will be described in detail with reference to the drawings as appropriate.

(Capillary Electrophoresis Device)

Figure 1:
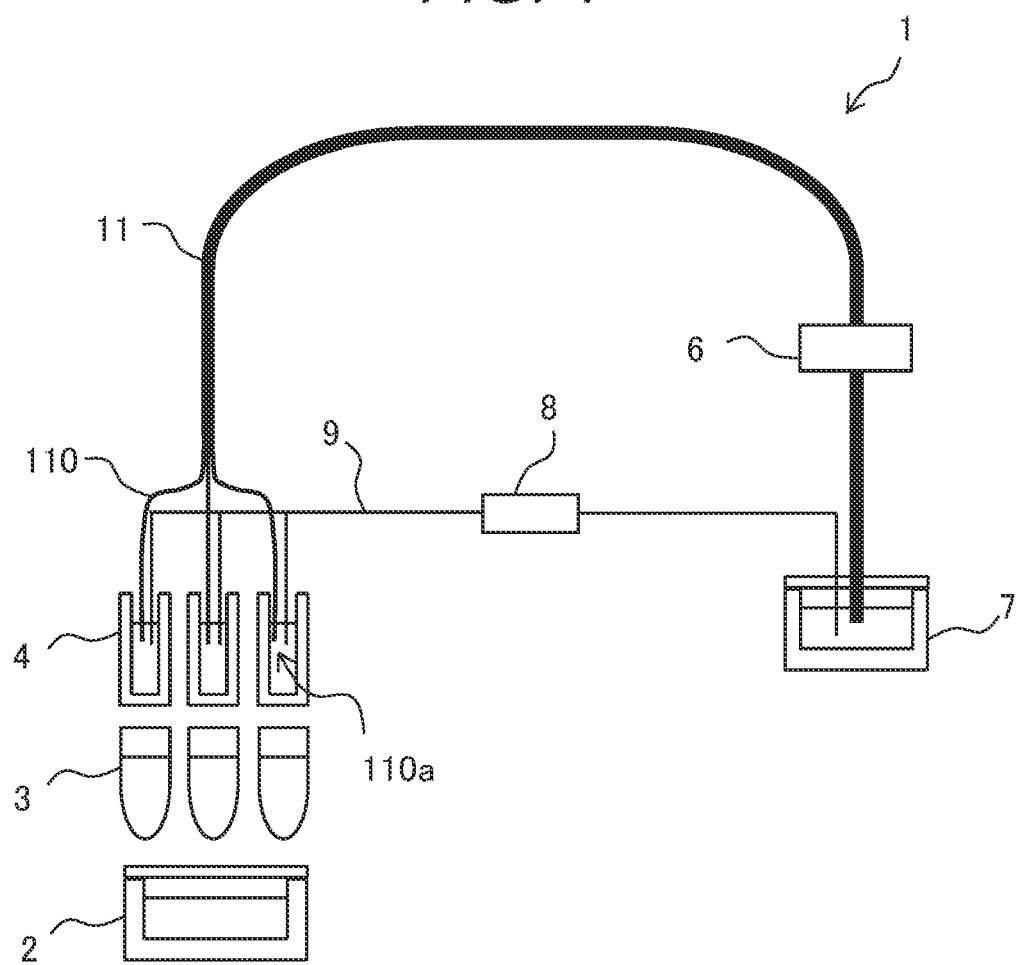
FIG. 1 is a schematic diagram illustrating a configuration example of a capillary electrophoresis device according to a first embodiment.
Figure 2:
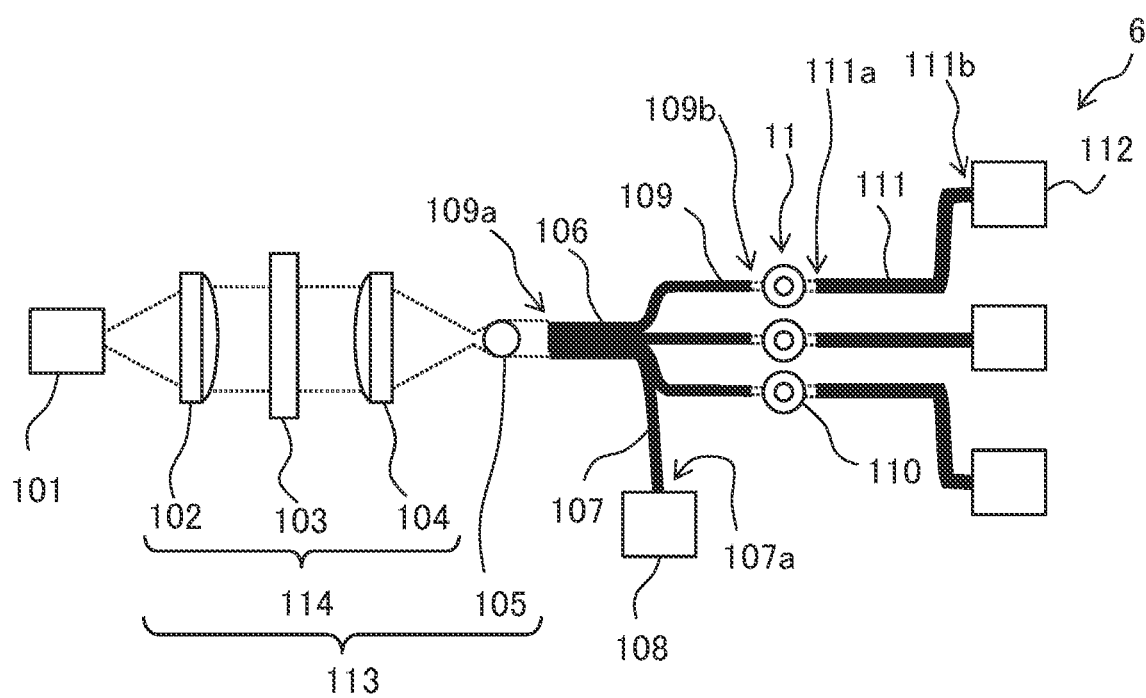
FIG. 2 is a schematic diagram illustrating a configuration example of a detection unit of the capillary electrophoresis device according to the first embodiment.

FIG. 1 is a schematic diagram illustrating a configuration example of a capillary electrophoresis device 1 according to a first embodiment. FIG. 2 is a schematic diagram illustrating a configuration example of a detection unit 6 of the capillary electrophoresis device 1 according to the first embodiment.

As illustrated in FIG. 1, the capillary electrophoresis device 1 includes a plurality of capillaries 110 into which samples to be measured are introduced and electrically separated. The plurality of capillaries 110 is integrated into a capillary array 11 at any position. Furthermore, the capillary electrophoresis device 1 includes a light source 101 (see FIG. 2) that generates light for analyzing the samples electrically separated in the plurality of capillaries 110. Moreover, the capillary electrophoresis device 1 further includes detectors 112 (see FIG. 2) that detect light transmitted through the capillaries 110. The light source 101 and the detectors 112 are components constituting the detection unit 6, and these will be described later.

Further, as illustrated in FIG. 2, the capillary electrophoresis device 1 includes an optical coupling optical system 113 and a plurality of irradiation optical fibers ("first optical fibers" in the claims) 109 between the light source 101 and the plurality of capillaries 110. Furthermore, the capillary electrophoresis device 1 includes a plurality of detection optical fibers ("second optical fibers" in the claims) 111 between the plurality of capillaries 110 and the detectors 112. Note that the optical coupling optical system 113 will be described later.

In each of the plurality of irradiation optical fibers 109, one end face 109a is connected to the optical coupling optical system 113, and the other end face 109b is arranged close to the corresponding capillary 110.

In each of the plurality of detection optical fibers 111, one end face 111a is arranged close to the corresponding capillary 110, and the other end face 111b is connected to the detector 112.

That is, the present embodiment has an arrangement in which the other end face 109b is opposite to a side surface of the capillary 110, the one end face 111a is opposite to the side surface of the capillary 110, and the other end face 109b and the one end face 111a face each other with the capillary 110 interposed therebetween. Note that the term "being opposite" means, for example, an arrangement in which a center of an optical axis of light emitted from the other end face 109b passes through an axial center of the capillary 110.

Furthermore, as illustrated in FIG. 1, the capillary electrophoresis device 1 includes an electrophoretic medium container 2 accommodating an electrophoretic medium, and a plurality of sample containers 3 accommodating the samples to be measured. In the capillary electrophoresis device 1, the plurality of capillaries 110 included in the capillary array 11 is connected to these containers before measurement, and the electrophoretic medium and the sample are sequentially injected by electrical means, pressure, or the like.

The capillary electrophoresis device 1 includes a plurality of injection-side electrode baths 4 and one discharge-side electrode bath 7. Each of the plurality of injection-side electrode baths 4 and the one discharge-side electrode bath 7 is filled with a buffer solution, and the capillaries 110 and an electrode 9 are immersed during electrophoresis. Then, when a high-voltage power supply 8 applies a voltage, molecules in the samples move in the capillaries 110 from the injection side toward the discharge side while being separated according to properties such as a molecular weight and the amount of charge by the electrophoresis. Each of the molecules having moved is detected by optical means when reaching the detection unit 6. Although not illustrated, the capillary electrophoresis device 1 further includes a pressure adjustment unit, a control unit, a signal processing unit, a display unit, a recording unit, and the like.

(Detection Unit)

As illustrated in FIG. 2, the detection unit 6 of the capillary electrophoresis device 1 includes the optical coupling optical system 113 and the plurality of detectors 112. The optical coupling optical system 113 couples light from the light source 101 to the plurality of irradiation optical fibers 109. The optical coupling optical system 113 includes, for example, an imaging optical system 114 and at least one lens 105. The imaging optical system 114 in the present embodiment includes, for example, a lens 102 and a lens 104. The imaging optical system 114 may include a band-pass filter 103 between the lens 102 and the lens 104. That is, examples of a specific configuration of the optical coupling optical system 113 include the formation of the lens 102, the band-pass filter 103, the lens 104, and the lens 105.

In a case where the detection unit 6 includes the optical coupling optical system 113 according to the specific configuration example described above, light emitted from the light source 101 is converted into collimated light by the lens 102, and then, only a specific wavelength is extracted by the band-pass filter 103. In a case where UV absorption measurement of proteins is performed, a transmission wavelength of the band-pass filter 103 can be set to 280 nm, 220 nm, or the like. In a case where NF measurement is performed, a transmission wavelength of the band-pass filter 103 can be set to 280 nm or the like. In a case where LIF measurement is performed, a transmission wavelength of the band-pass filter 103 can be set to an excitation wavelength of a fluorescent dye to be used. The band-pass filter 103 can be omitted in a case where an emission spectrum of the light source 101 has only a target wavelength component. As the light source 101, for example, a lamp light source such as a halogen lamp or a deuterium lamp, an LED light source, a laser light source, or the like can be used. Hereinafter, the case where the UV absorption measurement is performed will be described.

The light transmitted through the band-pass filter 103 is coupled to an optical fiber bundle (bundle 106) obtained by bundling the plurality of irradiation optical fibers 109 by the lens 104 and the lens 105. As a result, the light is split into the number of the irradiation optical fibers 109 included in the bundle 106. Note that, in the present embodiment, at least one optical fiber among the plurality of irradiation optical fibers 109 preferably has one end face 109a connected to the optical coupling optical system 113 and the other end face 107a connected to a detector 108 for reference light as illustrated in FIG. 1. That is, it is preferable to use at least one of the plurality of irradiation optical fibers 109 as a reference light optical fiber 107 in the present embodiment. The reference light optical fiber 107 and the detector 108 for reference light will be described later.

In this manner, the method of splitting light using the bundle 106 can be implemented with a simple and inexpensive configuration as compared with a method using a beam splitter, a fiber splitter, a waveguide, a diffraction grating, or the like, which can contribute to downsizing and cost reduction of the device. Furthermore, light is split by the optical coupling optical system 113 and the bundle 106 having the above-described configuration, an energy density of light (energy of light per unit area) does not decrease due to the splitting. Therefore, there is an advantage that the energy density of light at a position where the capillary 110 is irradiated with light can be kept high, that is, a detection sensitivity can be increased.

Figure 3A:
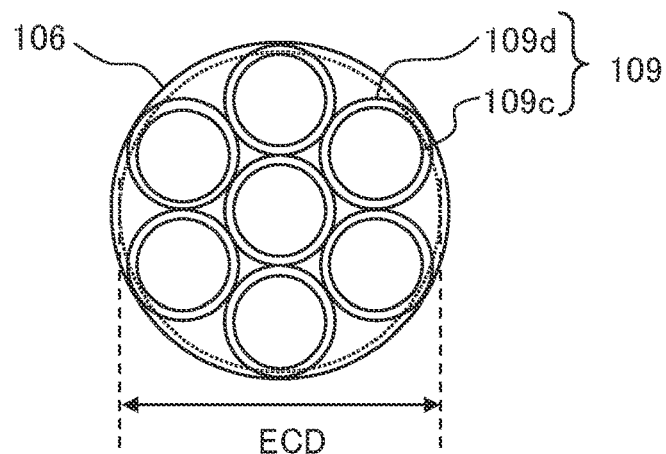
FIG. 3A is a schematic view illustrating an arrangement example (seven optical fibers) of first optical fibers on a light-input-side end face of a bundle.
Figure 3B:
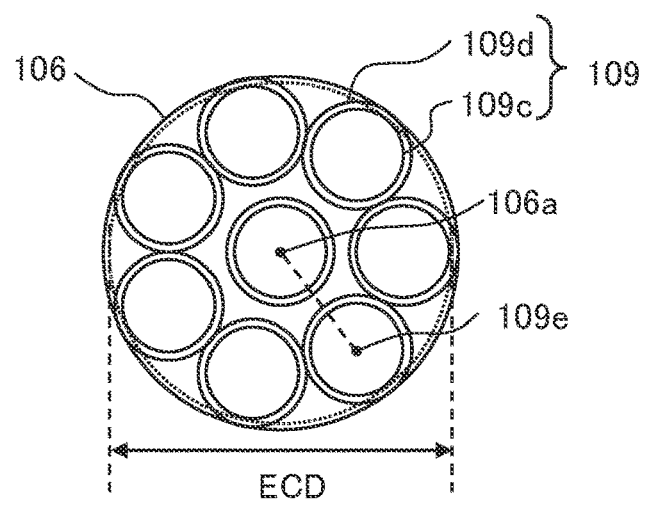
FIG. 3B is a schematic view illustrating an arrangement example (eight optical fibers) of the first optical fibers on the light-input-side end face of the bundle.
Figure 3C:
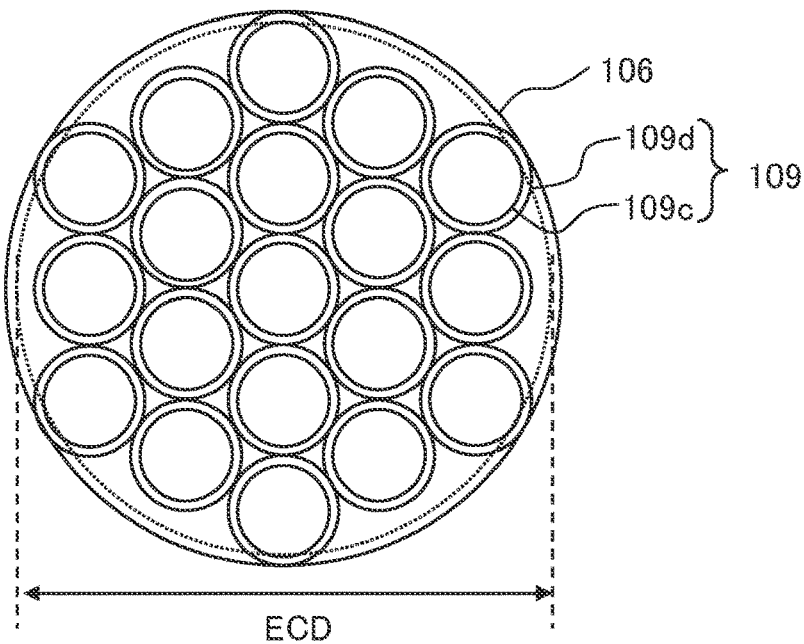
FIG. 3C is a schematic view illustrating an arrangement example (nineteen optical fibers) of the first optical fibers on a light-input-side end face of a bundle.

FIGS. 3A to 3C are schematic views illustrating arrangement examples (when the number of the irradiation optical fibers 109 is seven, eight, or nineteen, respectively) of the irradiation optical fibers 109 on a light-input-side end face (one end face 109a) of the bundle 106. Note that similarly to a general optical fiber, the irradiation optical fiber 109 has a two-layer structure of a core 109c at the center and a cladding 109d covering the periphery of the core. The core 109c is designed to have a higher refractive index than the cladding 109d, and light propagates in the state of being confined in the core 109c due to a phenomenon called total internal reflection. The detection optical fiber 111, the reference light optical fiber 107, and a connection optical fiber 401 to be described later also have the same configuration.

As illustrated in FIGS. 3A and 3C, it is desirable for the irradiation optical fibers 109 of the bundle 106 to have a closest-packed arrangement in order to increase the energy utilization efficiency of light as much as possible. Even in a case where the closest-packed arrangement is impossible with the number of the irradiation optical fibers 109 or in a case where it is difficult to control the arrangement of optical fibers, it is desirable to increase the energy utilization efficiency of light as much as possible. In such a case, for example, as illustrated in FIG. 3B, it is desirable to arrange the bundle 106 such that a distance from a center 106a of the bundle to a center 109e of the outermost peripheral irradiation optical fiber 109 is as small as possible. Note that in the bundle 106 having such a configuration, a diameter of a minimum enclosing circle of the cores 109c of the plurality of irradiation optical fibers 109 included in the bundle 106 can be set as an effective core diameter ECD.

(Koehler Illumination)

The lenses 102, 104, and 105 of the optical coupling optical system 113 illustrated in FIG. 2 constitute a Koehler illumination. Therefore, the lenses 102, 104, and 105 of the optical coupling optical system 113 can uniformize a spatial light emission intensity distribution of the light source 101 and couple light to the bundle 106 (to the plurality of irradiation optical fibers 109). The lens 102 and the lens 104 constitute the imaging optical system 114 (more specifically, an equal magnification imaging optical system). Therefore, it can be said that the optical coupling optical system 113 includes the imaging optical system 114 and at least one lens 105.

A light emitting surface of the light source 101 forms an image at a predetermined position by the lens 102 and the lens 104 constituting the equal magnification imaging optical system. The lens 105 is arranged such that an image formation position of the light emitting surface of the light source 101 by the lens 102 and the lens 104 coincides with a focal position or a combined focal position on the light input side of the lens 105. With such a configuration, the detection unit 6 can suppress fluctuations in the amount of light coupled to the bundle 106 among the optical fibers, and can couple substantially the same amount of light to all the irradiation optical fibers 109. Therefore, the detection unit 6 can uniformize measurement conditions for all the capillaries 110. Furthermore, the detection unit 6 performs the coupling to the bundle 106 with the spatial light emission intensity distribution of the light source 101 uniformized by the Koehler illumination as described above. Therefore, the detection unit 6 can suppress the fluctuation in the amount of coupled light accompanying a variation in a component position due to disturbance or the like at a position of the one end face 109a of the bundle 106, and can prevent a decrease in the detection sensitivity.

As another configuration, the light-input-side end face of the bundle 106 can be arranged at a position shifted in an optical-axis direction by a predetermined amount from the image formation position of the light emitting surface of the light source 101 by the lens 102 and the lens 104 without using the lens 105. In this case, spatial spread of light on the light-input-side end face of the bundle 106 is larger than that in a case where the light-input-side end face of the bundle 106 is arranged at the image formation position. As a result, it is possible to uniformize the amount of coupled light to the irradiation optical fibers 109 to some extent and to suppress the fluctuation in the amount of coupled light accompanying the variation in the component position due to the disturbance or the like.

Furthermore, in a case where the spatial light emission intensity distribution of the light source 101 is relatively uniform or in a case where the influence of the variation in the component position due to the disturbance or the like is small, it is desirable to arrange the light-input-side end face of the bundle 106 at the image formation position of the light emitting surface of the light source 101 by the lens 102 and the lens 104 without using the lens 105. In this case, equivalent sensitivity and throughput can be obtained with a smaller number of components.

(Reference Light)

As described above, at least one of the optical fibers included in the bundle 106 is preferably used as the reference light optical fiber 107. A light-output-side end face (the other end face 107a) of the reference light optical fiber 107 is directly connected to the detector 108 for reference light. Light propagated through the reference light optical fiber 107 is detected by the detector 108, and an intensity of the light is monitored, whereby it is possible to suppress the decrease in the detection sensitivity due to a fluctuation in the light emission intensity of the light source 101 by signal processing. The detector 108 will be described later.

(Close Arrangement of Optical Fiber and Capillary)

Light-output-side end faces (the other end faces 109b) of a plurality of the irradiation optical fibers 109 other than the reference light optical fiber 107 included in the bundle 106 are arranged in a direction perpendicular to a length direction of the capillary 110. That is, the other end faces 109b of the plurality of irradiation optical fibers 109 are arrayed in a direction parallel to an array plane of the plurality of capillaries 110 arranged in a straight line. That is, the arrangement is adopted in which light emitted from the other end faces 109b of the irradiation optical fibers 109 perpendicularly enters the capillaries 110. Furthermore, the other end faces 109b of the plurality of irradiation optical fibers 109 are linearly aligned at regular intervals and arranged close to the capillaries 110. Moreover, an array pitch of the plurality of irradiation optical fibers 109 coincides with an array pitch of the plurality of capillaries 110. That is, each of the plurality of capillaries 110 and each of the plurality of irradiation optical fibers 109 are arranged to correspond to each other.

The above arrangement enables lengths from end faces 110a (see FIG. 1) of the respective capillaries 110 into which the samples are injected to portions irradiated with light in the capillaries 110 to be made uniform with a simple configuration. More preferably, the plurality of capillaries 110 is arranged such that lengths from the end faces 110a into which the samples are injected to the end faces of the irradiation optical fibers 109 arranged close to the capillary 110 are equal. Then, the capillary electrophoresis device 1 can measure the plurality of samples under the same condition.

Furthermore, a position of the other end face 109b of each of the irradiation optical fibers 109 can be accurately aligned with a center position of the corresponding capillary 110 with the above arrangement. Note that a distance between the light-output-side end face (the other end face 109b) of the irradiation optical fiber 109 and the capillary 110 which are closely arranged will be described later.

Light propagated through each of the irradiation optical fibers 109 is directly emitted to each of the corresponding capillaries 110 without passing through the lens. Note that the capillary 110 is a thin tube made of glass and coated with polyimide. In each of the capillaries 110, the polyimide coating in the vicinity of a position to be irradiated with light is removed in advance such that the glass is exposed.

Light transmitted through each of the capillaries 110 is coupled to the corresponding detection optical fiber 111 of which the light-input-side end face (one end face 111a) is arranged close to the capillary 110. The light coupled to the detection optical fiber 111 is propagated through the detection optical fiber 111 and is guided to the detector 112.

Note that, for example, spectrometers including a photo-diode, a charge coupled device (CCD) camera, a complementary metal oxide semiconductor (CMOS) camera, a photomultiplier tube, and a diffraction grating or the like can be used as both the detector 112 and the detector 108. These spectrometers can be provided one by one to correspond to each of the plurality of detection optical fibers 111. Furthermore, for example, a spectrometer capable of collectively dispersing light emitted from the plurality of detection optical fibers 111 can also be used as the detector 112. That is, it is sufficient that the detector 112 can detect the light emitted from the plurality of detection optical fibers 111 separately for each of the detection optical fibers 111, and the number of the detectors 112 is not limited. The number of the detectors 112 may be one or two or more as long as it is possible to individually detect beams of the light emitted from all the provided detection optical fibers 111. Furthermore, the detectors 112 may be provided one by one to correspond to the detection optical fibers 111 (FIG. 2 illustrates a state in which the detectors 112 are provided one by one to correspond to the detection optical fibers 111). The single CCD camera can collectively disperse the light emitted from the plurality of detection optical fibers 111.

As described above, the light-output-side end faces (the other end faces 109b) of the irradiation optical fibers 109 are arrayed in the direction perpendicular to the length direction of the capillary 110 and parallel to the array plane of the plurality of capillaries 110 arrayed in the straight line. Further, the one end faces 111a of the detection optical fibers 111 are arranged in the direction perpendicular to the length direction of the capillary 110 and parallel to the array plane of the plurality of capillaries 110 arranged in the straight line. Moreover, the one end faces 111a of the detection optical fibers 111 are linearly aligned at regular intervals and arranged close to the capillaries 110. Furthermore, the array pitch of the plurality of detection optical fibers 111 coincides with the array pitch of the plurality of capillaries 110. That is, the irradiation optical fibers 109 are arranged such that light emitted from the other end faces 109b of the irradiation optical fibers 109 perpendicularly enters the capillary 110, passes through the capillary 110, and enters the other end faces 111b of the detection optical fibers 111 directly.

In this manner, the UV absorption measurement can be implemented with a downsized and simple configuration by irradiating the capillaries 110 with light and detecting transmitted light of the capillaries 110 using only the optical fibers without installing any lens between the light-output-side end faces (the other end faces 109b) of the irradiation optical fibers 109 and the capillaries 110 and between the light-input-side end faces (the one end faces 111a) of the detection optical fibers 111 and the capillaries 110. In addition, the configuration that does not use a lens has a great cost reduction effect. When the UV absorption measurement is performed, it is necessary to use an optical component having a high transmittance with respect to ultraviolet light, but a material having a high transmittance with respect to ultraviolet light is expensive, and thus, manufacturing of a lens using such a material requires cost. Furthermore, arraying such lenses at regular intervals requires a higher cost. Therefore, when the device is configured not to use a lens as in the present embodiment, manufacturing cost can be greatly reduced. Moreover, there is no need to install a lens or a lens array at a specific position, and thus, manufacturing cost required for the installation can also be reduced. Note that the distance between the light-input-side end face (the one end face 111a) of the detection optical fiber 111 and the capillary 110 which are closely arranged will be described later.

Figure 4A:
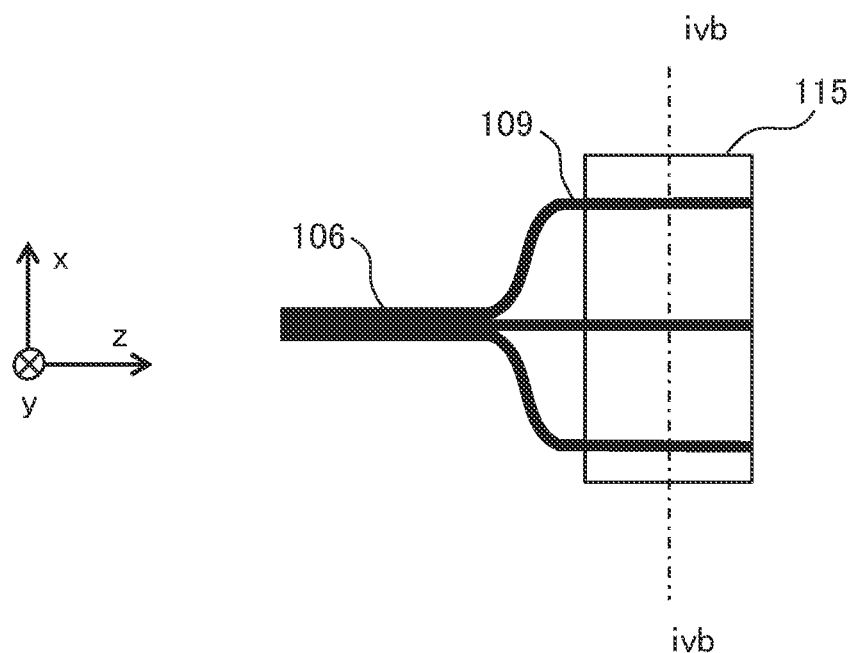
FIG. 4A is a schematic plan view illustrating a configuration example in a case where the first optical fibers are fixed to a positioning array substrate.
Figure 4B:
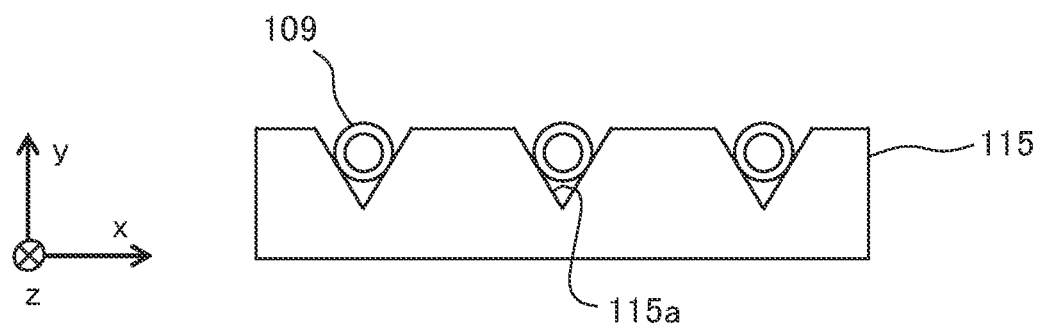
FIG. 4B is a cross-sectional view taken along a line ivb-ivb of FIG. 4A.

Here, FIG. 4A is a schematic plan view illustrating a configuration example in a case where the irradiation optical fiber 109 is fixed to a positioning array substrate 115. FIG. 4B is a cross-sectional view taken along a line ivb-ivb of FIG. 4A.

For example, as illustrated in FIGS. 4A and 4B, at least one of the irradiation optical fibers 109, the detection optical fibers 111, or the capillaries 110 is preferably positioned one by one by a plurality of grooves 115a of the positioning array substrate 115 including the grooves 115a. Furthermore, in a case where a plurality of the positioning array substrates 115 is provided, it is preferable that positions of the grooves 115a coincide with each other. The irradiation optical fiber 109, the detection optical fiber 111, and the capillary 110 can be mounted with a high positional accuracy by being positioned by the positioning array substrate 115, and the decrease in the detection sensitivity caused by a positional deviation can be suppressed. Since the groove 115a of the positioning array substrate 115 can be manufactured with a high accuracy of several μm or less using the current processing technology, the optical fiber and the capillary 110 can be positioned with a high positional accuracy as described above. A cross-sectional shape of the groove 115a of the positioning array substrate 115 can be a V-shape, a spherical shape, a trapezoidal shape, or the like.

As described above, it is preferable that the array pitches of the light-output-side end faces of the irradiation optical fibers 109 and the light-input-side end faces of the capillaries 110 and the detection optical fibers 111 are equal to each other. If these array pitches are too small, light emitted from the irradiation optical fiber 109 enters the detection optical fiber 111 other than the corresponding detection optical fiber 111, so that the sensitivity decreases. In order to prevent such a decrease in the detection sensitivity and obtain a high detection sensitivity, an array pitch pi is preferably set to a value that satisfies the following Formula (1).

[Formula 1]

$$pi > \frac{c_0 + c_1}{2} + (d_1 + d_2 + R_{out}) \frac{NA}{\sqrt{1 - NA^2}} \quad (1)$$

Here, in Formula (1), $c_0$ is a core diameter of the irradiation optical fiber 109. A core diameter of the detection optical fiber 111 is denoted by $c_1$. A distance between the end face 109b of the irradiation optical fiber 109 and the capillary 110 is denoted by $d_1$. A distance between the end face 111a of the detection optical fiber 111 and the capillary 110 is denoted by $d_2$. An outer diameter of the capillary 110 is denoted by $R_{out}$. NA is a numerical aperture of the irradiation optical fiber 109. As an example, the array pitch pi is desirably set to at least about 269 μm or more, for example, when $c_0$=105 μm, $c_1$=200 μm, $d_1$=$d_2$=150 μm, $R_{out}$=150 μm, and NA=0.25. On the other hand, if the array pitch pi is set to be too large, the device becomes large, and thus, the array pitch pi is preferably set to be small within a range of Formula (1).

Effects, Etc.

As described above, the capillary electrophoresis device 1 according to the present embodiment couples light from the light source 101 to the bundle 106 of the plurality of irradiation optical fibers 109 to split the light into a plurality of beams. Furthermore, the capillary electrophoresis device 1 arranges the one end faces 109b of the respective irradiation optical fibers 109 close to the corresponding capillaries 110, respectively, to directly irradiate the corresponding capillaries 110 with the light emitted from the irradiation optical fibers 109, respectively. Further, the capillary electrophoresis device 1 directly couples each beams of the light transmitted through each of the capillaries 110 to the corresponding detection optical fiber 111 and guides the light to the detector 112. With such a configuration, the capillary electrophoresis device 1 can detect the plurality of samples by simultaneously performing electrophoresis in the plurality of capillaries 110. Therefore, the capillary electrophoresis device 1 can obtain higher throughput than that in a conventional capillary electrophoresis device.

Furthermore, when the light is coupled to the bundle 106 by the Koehler illumination, the capillary electrophoresis device 1 can suppress the fluctuation in the amount of light coupled to each of the irradiation optical fibers 109, and can uniformly split the light into a plurality of beams without reducing the energy density of light.

Furthermore, when the reference light optical fiber 107 is used, the capillary electrophoresis device 1 can monitor the intensity of the reference light and suppress the decrease in the detection sensitivity due to the fluctuation in the emission intensity by the signal processing.

Moreover, the downsized and inexpensive configuration can be achieved since the capillary electrophoresis device 1 irradiates the capillaries 110 with the light and detects the transmitted light of the capillaries 110 only using the optical fibers.

Further Detailed Description

Hereinafter, structures and effects of the capillary electrophoresis device 1 according to the present embodiment will be described in more detail on the basis of mathematical expressions and simulation results.

First, effects of the Koehler illumination in the present embodiment will be described.

Figure 5A:
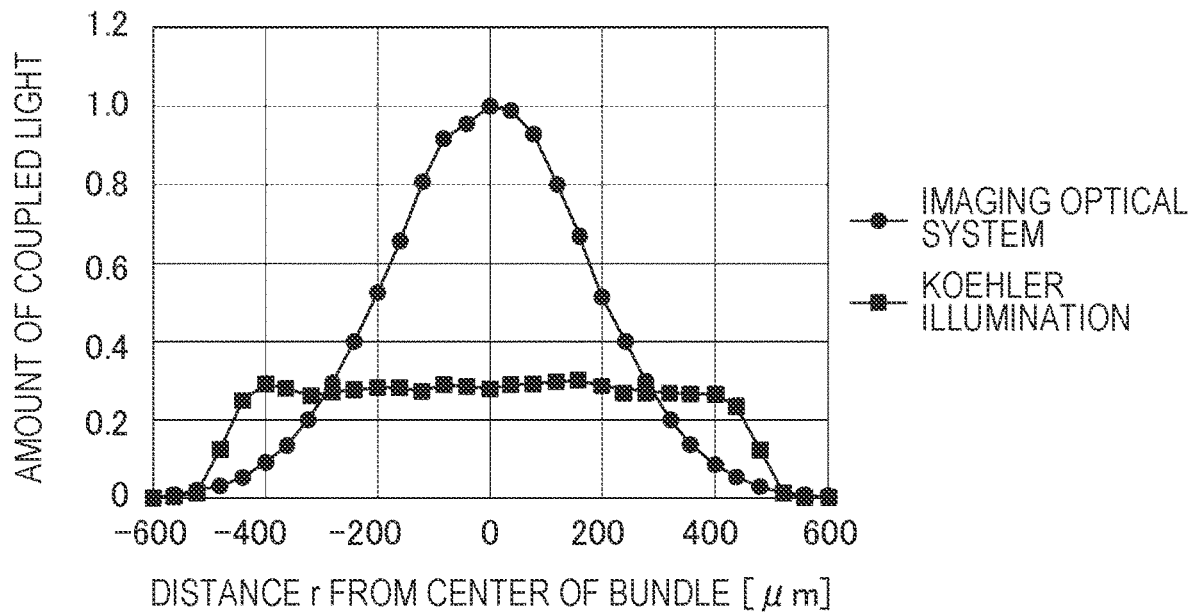
FIG. 5A is a graph illustrating an example of simulation results regarding position dependence of the amount of light coupled to the optical fiber and stability thereof. In the drawing, the horizontal axis represents a distance r [μm] from a center of the bundle, and the vertical axis represents the amount of coupled light.
Figure 5B:
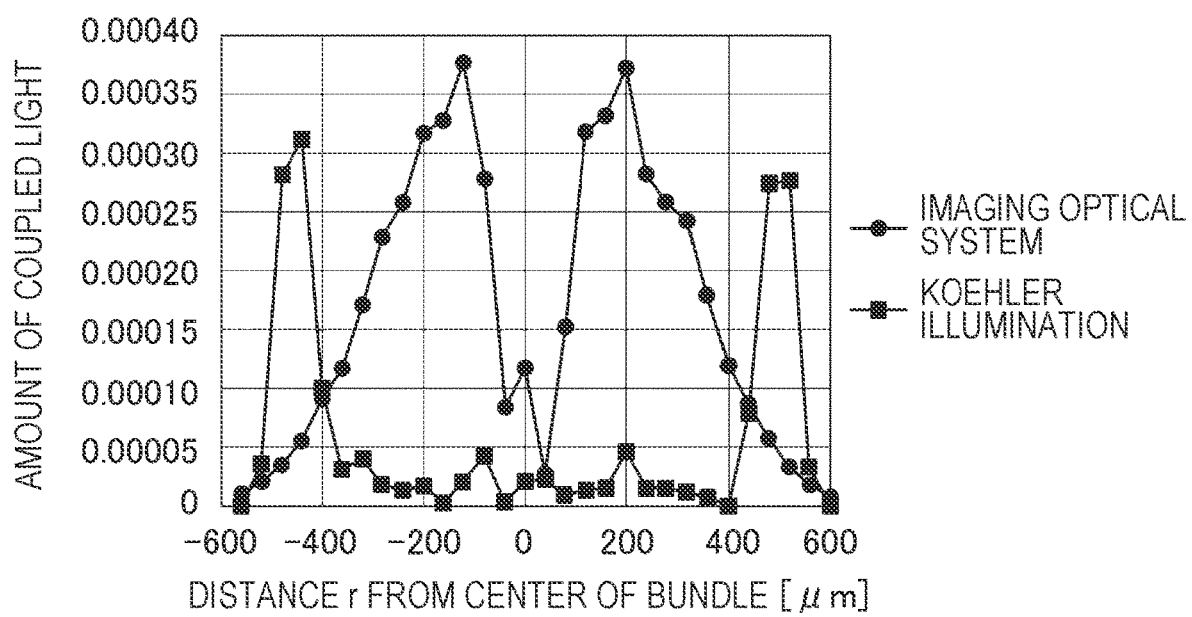
FIG. 5B is a graph illustrating an example of simulation results regarding position dependence of the amount of light coupled to the optical fiber and stability thereof. In the drawing, the horizontal axis represents a distance r [μm] from a center of the bundle, and the vertical axis represents the amount of coupled light.

What is important in the case of splitting light using the bundle 106 of the irradiation optical fibers 109 and performing UV absorption measurement is the uniformity and stability of the amount of light coupled to each of the irradiation optical fibers 109. FIGS. 5A and 5B are graphs illustrating examples of simulation results regarding the position dependence of the amount of light coupled to the optical fiber and the stability thereof. FIG. 5A illustrates simulation results regarding a case where an imaging optical system including the lens 102 and the lens 104 is used without providing the lens 105 and a case where the Koehler illumination including the lenses 102, 104, and 105 is used in order to verify the uniformity. FIG. 5A illustrates how the amount of light coupled into the bundle 106 depends on a distance r from a center of the bundle 106 regarding both the cases.

In a simulation, it is assumed that the light source 101 has a Gaussian light emission intensity spatial distribution having a full width at half maximum of about 0.35 mm. The simulation was performed on the basis of ray tracing using simulation software (Zemax OpticStudio 17.5) with conditions that a transmission wavelength of the band-pass filter 103 is 220 nm, both the lens 102 and the lens 104 have a focal length of 50 mm and an outer diameter of 20 mmφ, the lens 105 has a focal length of 2.71 mm and an outer diameter of 3 mmφ, and the optical fiber has a core diameter of 105 µm and NA of 0.25.

In the case where the imaging optical system is used as illustrated in FIG. 5A, the light emission intensity spatial distribution of the light source 101 is reflected, and the amount of coupled light shows Gaussian dependence with respect to the distance r. Therefore, the amount of coupled light in the case of using the imaging optical system is larger in an optical fiber closer to the center of the bundle 106, and is smaller in peripheral optical fibers. In this manner, since the position dependence of the amount of coupled light to the bundle 106 is high in this case, and thus, the amount of irradiated light differs for each of the capillaries 110.

On the other hand, in the case of using the Koehler illumination, the amount of light coupled to the optical fiber takes a substantially constant value in a region (distance r) of ±about 400 µm from the center of the bundle 106. Therefore, in a case where a plurality of optical fibers is arranged in this region, substantially the same light amount of light can be coupled to all the optical fibers. In this manner, in this case, all the capillaries 110 are irradiated with substantially the same light amount of light, and thus, it is possible to simultaneously measure a plurality of different samples under the same condition. Note that the region where the amount of coupled light is constant (distance r from the center of the bundle 106) can be freely set by changing a ratio between focal lengths of the lens 104 and the lens 105.

Regarding the stability of the amount of coupled light, it is necessary to consider the influence of positional displacement of an optical component due to disturbance or the like. For example, when a position of a light-input-side end face of an optical fiber varies, the amount of light coupled to the optical fiber also fluctuates accordingly. Assuming that the amount of light coupled to the optical fiber at a position (x, y, z) of the optical fiber is I and the amount of positional displacement of the optical fiber is (Δx, Δy, Δz), a magnitude of a fluctuation ΔI of the amount of coupled light accompanying the displacement of the optical fiber is approximately given by the following Formula (2).

[Formula 2]

$$\Delta I = \frac{\partial I}{\partial x}\Delta x + \frac{\partial I}{\partial y}\Delta y + \frac{\partial I}{\partial z}\Delta z = \nabla I \cdot \begin{pmatrix} \Delta x \\ \Delta y \\ \Delta z \end{pmatrix} \quad (2)$$

From Formula (2), it can be seen that the fluctuation ΔI of the amount of coupled light increases as a spatial derivative ∇I of the amount of coupled light of the optical fiber increases. FIG. 5B illustrates absolute values of magnitudes of fluctuations in the amount of coupled light that occur when the position of the light-input-side end face of the optical fiber varies by Δr in the r direction, the absolute values being calculated on the basis of the results of FIG. 5A. In this simulation, the magnitude Δr of the variation of the position was set to 0.1 µm. As a result, in the case of using the imaging optical system, it can be seen that the fluctuation ΔI in the amount of coupled light is large in a region other than r=0 μm as illustrated in FIG. 5B. This reflects that a differential of the amount of coupled light with respect to the distance r is large in the corresponding region, and thus, the detection sensitivity corresponding to the optical fiber arranged in this region decreases. On the other hand, in the case of using the Koehler illumination, it can be seen that the fluctuation in the amount of coupled light is suppressed in a range of r=about −360 μm to 360 μm by the effect of uniformizing the light intensity distribution. Therefore, when the optical fiber is arranged in this region, it is possible to suppress the fluctuation in the amount of light coupled to the optical fiber and to prevent the decrease in the detection sensitivity.

(Core Diameter of Irradiation Optical Fiber)

Next, the core diameter $c_0$ of the irradiation optical fiber 109 in the present embodiment will be described. The core diameter $c_0$ of the irradiation optical fiber 109 is determined mainly from the viewpoint of three performances of resolution, throughput, and a detection sensitivity.

The resolution is an ability to separate and detect different types of molecules flowing through the capillary 110 at the time of electrophoresis, and increases as a width ΔL in a length direction of a light irradiation region with respect to the capillary 110 decreases. This ΔL is approximately given by the following Formula (3) when spatial spread of light emitted from the irradiation optical fiber 109 until reaching the inside of the capillary 110 and refraction of the light in the capillary 110 are ignored for the sake of simplicity.

[Formula 3]
$$\Delta L \approx c_0 \quad (3)$$

The throughput increases as the number of the capillaries 110 that can be simultaneously irradiated with light, that is, the number of the irradiation optical fibers 109 included in the bundle 106 increases. Since the number N of the irradiation optical fibers 109 is approximately proportional to a ratio of a cross-sectional area of the optical fibers to a cross-sectional area of light at the light-input-side end face of the bundle 106, the following Formula (4) is approximately established.

[Formula 4]
$$N \propto \frac{\pi(D/2)^2}{\pi(c_0'/2)^2} = \left(\frac{D}{c_0'}\right)^2 \quad (4)$$

Here, in Formula (4), D is a beam diameter of the light at the light-input-side end face of the bundle 106, and $c_0'$ ($>c_0$) is a cladding diameter of the irradiation optical fiber 109. The cladding diameter $c_0'$ is generally, for example, about 125 μm when the core diameter $c_0$ is 105 μm, and about 220 μm when the core diameter is 200 μm, and is a value larger than the core diameter by about 10 to 20%. Therefore, when a is a constant between 1.1 and 1.2, $c_0'=\alpha c_0$ can be expressed, and thus, Formula (4) can be rewritten as the following Formula (5) using the core diameter $c_0$.

[Formula 5]
$$N \propto \left(\frac{D}{c_0}\right)^2 \quad (5)$$

The detection sensitivity increases as a light amount P with which the inside (a portion through which the sample passes) of the capillary 110 is irradiated increases. When the total amount of light incident on the bundle 106 is $P_0$ and the spatial spread of light until the light emitted from the irradiation optical fiber 109 reaches the inside of the capillary 110 and the refraction of light in the capillary 110 are ignored for the sake of simplicity considering that the intensity distribution of light is uniformized by the Koehler illumination, the light amount P is approximately given by the following Formula (6).

[Formula 6]
$$P \approx \begin{cases} P_0 \left(\frac{c_0}{D}\right)^2 & (c_0 \leq R_{in}) \\ P_0 \dfrac{R_{in} c_0}{\pi(D/2)^2} & (c_0 > R_{in}) \end{cases} \quad (6)$$

Here, in Formula (6), $R_{in}$ is an inner diameter of the capillary 110 and is typically about 50 μm. The reason why the expression of the light amount P varies depending on a condition is that all beams of light emitted from the irradiation optical fiber 109 are emitted into the capillary 110 when $c_0 \leq R_{in}$, whereas a part of the light is emitted into the capillary 110 when $c_0 > R_{in}$. Here, the mathematical expressions based on the approximation that ignores the spread and the refraction of light are used for the sake of simplification of the description, but a qualitative relationship between the core diameter $c_0$ and the performance does not change even in the case of considering these effects.

Figure 6:
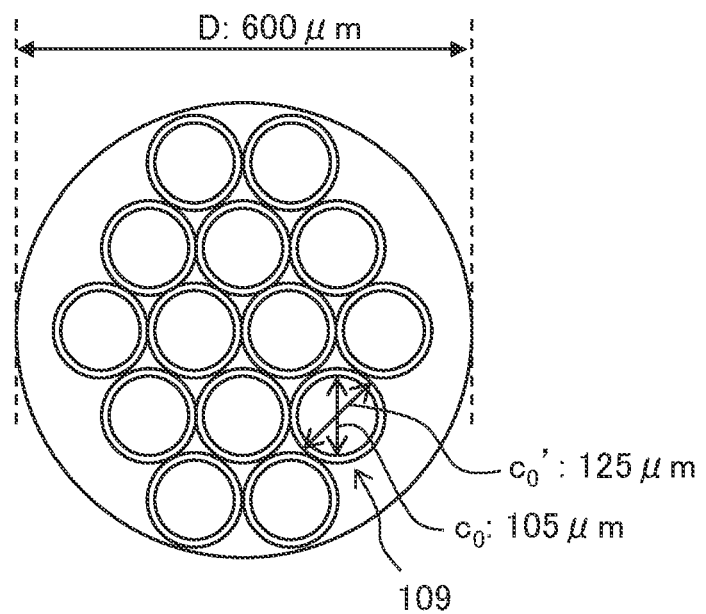
FIG. 6 is a schematic view for describing a beam diameter and an arrangement example of the first optical fibers.

As can be seen from Formulas (3), (5), and (6), there is a trade-off relationship between the throughput and resolution, and the detection sensitivity. When the core diameter $c_0$ decreases, the throughput and the resolution are improved, but the detection sensitivity decreases. Therefore, the core diameter $c_0$ needs to be determined in accordance with specifications of a target device. The present inventors have found that the detection sensitivity equivalent to that of the conventional capillary electrophoresis device can be achieved by actually conducting a T absorption measurement experiment. Note that the UV absorption measurement experiment was performed using a commercially available deuterium lamp, for example, by setting the beam diameter D to 600 μm, the cladding diameter $c_0'$ of the irradiation optical fiber 109 to 125 μm, and the core diameter $c_0$ to 105 μm. The width ΔL of the light irradiation region at this time was 105 μm. This is equal to or less than a value (200 to 800 μm) in the conventional capillary electrophoresis device in which the number of capillaries is one. From this, it can be seen that the capillary electrophoresis device 1 according to the present embodiment has higher resolution than the conventional capillary electrophoresis device. Note that FIG. 6 is a schematic view illustrating the beam diameter D and an arrangement example of the irradiation optical fibers 109. As illustrated in FIG. 6, fourteen irradiation optical fibers 109 each having the cladding diameter $c_0'$ of 125 μm (core diameter $c_0$ of 105 μm) can be arranged in a beam region having the beam diameter D of 600 μm. Therefore, in this case, the capillary electrophoresis device 1 according to the present embodiment can obtain throughput which is fourteen times that of the conventional capillary electrophoresis device.

(Core Diameter of Detection Optical Fiber)

Next, the core diameter of the detection optical fiber 111 in the present embodiment will be described. The core diameter of the detection optical fiber 111 is determined mainly from the viewpoint of a detection sensitivity and crosstalk. From the viewpoint of the detection sensitivity, it is preferable to set a value large enough to detect most of light (hereinafter, referred to as signal light) transmitted through the capillary 110. Light emitted from the irradiation optical fiber 109 spreads in a direction perpendicular to an optical axis until reaching the detection optical fiber 111. Therefore, the core diameter $c_1$ of the detection optical fiber 111 is preferably set to be larger than the core diameter $c_0$ of the irradiation optical fiber 109. Then, more light transmitted through the capillaries can be detected than that in a case where the core diameter $c_1$ of the detection optical fiber 111 is the same as the core diameter $c_1$ of the irradiation optical fiber 109, and the detection sensitivity is improved. On the other hand, when the core diameter of the detection optical fiber 111 is set to a value larger than necessary, there is a possibility that light (hereinafter, referred to as stray light) transmitted through a portion other than the inside of the capillary 110, which becomes a source of noise, is detected, and conversely, the detection sensitivity decreases. Further, light (hereinafter, referred to as crosstalk light) transmitted through the inside of another adjacent capillary 110 is detected, and the risk of occurrence of crosstalk increases.

Figure 7A:
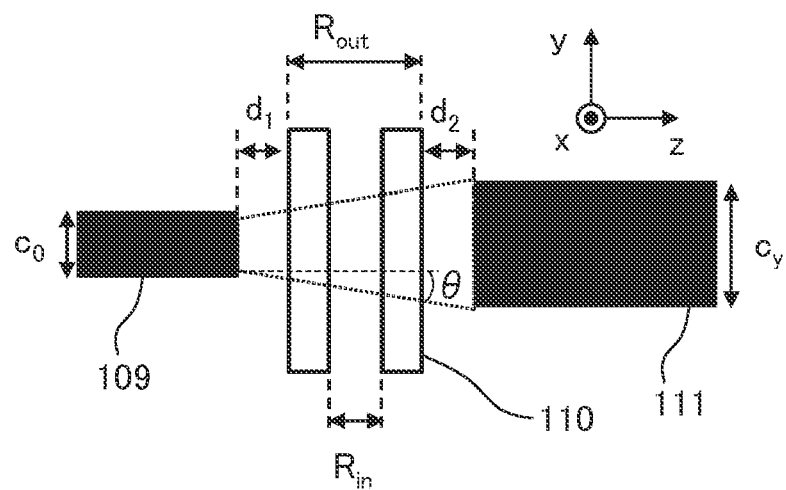
FIG. 7A is a schematic view of a yz cross section illustrating a state where light emitted from an irradiation optical fiber (first optical fiber) passes through a capillary and reaches a detection optical fiber (second optical fiber).
Figure 7B:
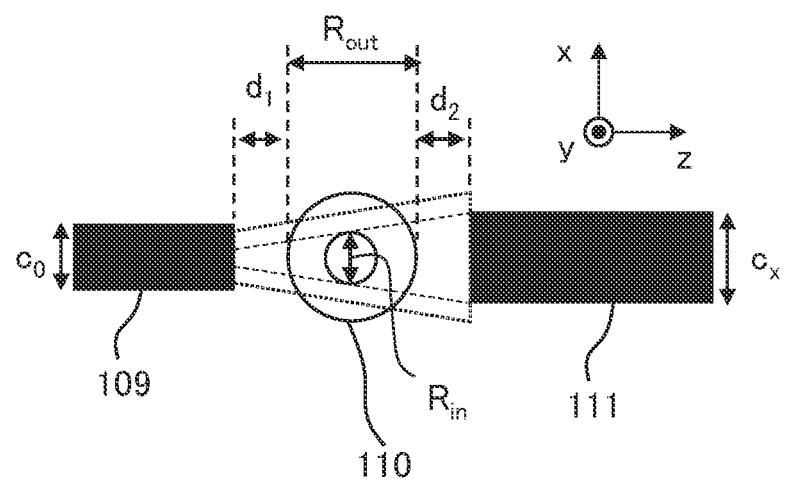
FIG. 7B is a schematic view of an xz cross section illustrating a state where light emitted from the first optical fiber passes through the capillary and reaches the second optical fiber.

FIG. 7A is a schematic view of a yz cross section illustrating a state where light emitted from the irradiation optical fiber 109 passes through the capillary 110 and reaches the detection optical fiber 111. FIG. 7B is a schematic view of an xz cross section illustrating a state where light emitted from the irradiation optical fiber 109 passes through the capillary 110 and reaches the detection optical fiber 111. Here, a y direction in FIGS. 7A and 7B is the length direction of the capillary 110, a z direction is a light emission direction, and an x direction is a direction perpendicular to a yz plane.

As illustrated in FIG. 7A, all beams of the light emitted from the irradiation optical fiber 109 pass through the inside of the capillary 110 in the yz cross section at the center of the capillary 110. Therefore, in the yz cross section, it is sufficient to determine a core diameter $c_y$ of the detection optical fiber 111 such that all beams of the light emitted from the irradiation optical fiber 109 are coupled in order to detect all beams of the signal light. The core diameter $c_y$ in the y direction of the detection optical fiber 111 in this case is given by the following Formula (7) when the refraction of light in the capillary 110 is ignored from FIG. 7A.

[Formula 7]
$$c_y = c_0 + 2(d_1 + d_2 + R_{out})\tan\theta \tag{7}$$

Here, θ is a divergence angle of the light from the irradiation optical fiber 109 illustrated in FIG. 7A. When the relationship of NA=sin θ is used, tan θ=NA/√(1−NA²) can be expressed, and thus, Formula (7) can be rewritten as Formula (8) using NA.

[Formula 8]
$$c_y = c_0 + 2(d_1 + d_2 + R_{out})\frac{NA}{\sqrt{1-NA^2}} \tag{8}$$

On the other hand, as illustrated in FIG. 7B, not all beams of the light emitted from the irradiation optical fiber 109 necessarily pass through the inside of the capillary 110 in the xz cross section at the center of the capillary 110. Hereinafter, a minimum core diameter $c_x$ of the detection optical fiber 111 required to detect all beams of the signal light in the xz cross section is obtained separately for the respective conditions. Assuming that x=f(z) is an equation of a straight line (a tangent of a circle having a diameter $R_{in}$ with the origin as a center) that has an inclination of tan θ in the xz plane and is in contact with the inside of the capillary 110 with the center position of the capillary 110 as the origin, f(z) is given by the following Formula (9).

[Formula 9]
$$f(z) = \frac{NA}{\sqrt{1-NA^2}}z + \frac{R_{in}}{2\sqrt{1-NA^2}} \tag{9}$$

The expression of the core diameter $c_x$ of the detection optical fiber 111 differs depending on a magnitude relationship of ±$c_0$/2 with a value (Formula (10)) of f(z) at the light-output-side end face of the irradiation optical fiber 109.

[Formula 10]
$$f\left(-\left(d_1 + \frac{R_{out}}{2}\right)\right) = -\frac{NA}{\sqrt{1-NA^2}}\left(d_1 + \frac{R_{out}}{2}\right) + \frac{R_{in}}{2\sqrt{1-NA^2}} \tag{10}$$

FIGS. 8A to 8C are all schematic views of the xz cross section illustrating a state in which light emitted from the irradiation optical fiber 109 passes through the capillary 110 and reaches the detection optical fiber 111 under conditions illustrated in the drawings.

In a case where 2f (−($d_1$+$R_{out}$/2))>$c_0$ illustrated in FIG. 8A, all beams of the light emitted from the irradiation optical fiber 109 pass through the inside (within the inner diameter) of the capillary 110. Therefore, the core diameter $c_x$ of the detection optical fiber 111 is expressed by the same formula as the core diameter $c_y$ of the detection optical fiber 111 as the following formula (11) when the refraction of light in the capillary 110 is ignored.

[Formula 11]
$$c_x = c_0 + 2(d_1 + d_2 + R_{out})\frac{NA}{\sqrt{1-NA^2}} \quad \left(2f\left(-\left(d_1 + \frac{R_{out}}{2}\right)\right) > c_0\right) \tag{11}$$

In a case where −$c_0$≤2f(−($d_1$+$R_{out}$/2))≤$c_0$ illustrated in FIG. 8B, $c_x$ is obtained as the following formula (12) using a value f($d_2$+$R_{out}$/2) of f(z) at the light-input-side end face of the detection optical fiber 111 when the refraction of light in the capillary 110 is ignored.

[Formula 12]

$$c_x = 2f\left(d_2 + \frac{R_{out}}{2}\right) \quad (-c_0 \leq 2f \quad \left(-\left(d_1 + \frac{R_{out}}{2}\right)\right) \leq c_0) \quad (12)$$

$$= \frac{2NA}{\sqrt{1-NA^2}}\left(d_2 + \frac{R_{out}}{2}\right) + \frac{R_{in}}{\sqrt{1-NA^2}} \quad (-c_0 \leq 2f \quad \left(-\left(d_1 + \frac{R_{out}}{2}\right)\right) \leq c_0)$$

In a case where $2f(-(d_1+R_{out}/2))<-c_0$ illustrated in FIG. 8C, $c_x$ can be expressed as $c_x=2g(d_2+R_{out}/2)$ using a value $g(d_2+R_{out}/2)$ at the light-input-side end face of the detection optical fiber 111 of a straight line $x=g(z)$ (the straight line having a larger inclination among straight lines that pass through coordinates $(x, z)=(-c_0/2, -(d_1+R_{out}/2))$ and are in contact with the inside of the capillary 110) illustrated in the drawing when the refraction of the light in the capillary 110 is ignored. When the inclination is m, $g(z)$ can be expressed by the following Formula (13).

[Formula 13]

$$g(z) = m\left(z + d_1 + \frac{R_{out}}{2}\right) - \frac{c_0}{2} \quad (13)$$

When $z=d_2+R_{out}/2$ is put into Formula (13), $c_x$ is expressed by the following Formula (14).

[Formula 14]

$$c_x = m(d_1 + d_2 + R_{out}) - \frac{c_0}{2} \quad \left(2f\left(-\left(d_1 + \frac{R_{out}}{2}\right)\right) < -c_0\right) \quad (14)$$

The inclination m is determined from a condition that the straight line $x=g(z)$ is a tangent of a circle representing an inner diameter portion of the capillary 110 expressed by the following Formula (15).

[Formula 15]

$$z^2 + x^2 = \left(\frac{R_{in}}{2}\right)^2 \quad (15)$$

In order for $g(z)$ to be the tangent of the circle represented by Formula (13), there must be one intersection on the xz plane of Formula (13) and Formula (15). That is, a discriminant of a quadratic equation for z obtained by putting $x=g(z)$ given by Formula (13) into Formula (14) needs to be zero. This condition is expressed by the following Formula (16).

[Formula 16]

$$\left(\left(\frac{R_{in}}{2}\right)^2 - \left(d_1 + \frac{R_{out}}{2}\right)^2\right)m^2 + c_0\left(d_1 + \frac{R_{out}}{2}\right)m + \left(\frac{R_{in}}{2}\right)^2 - \left(\frac{c_0}{2}\right)^2 = 0 \quad (16)$$

When Formula (16) is solved for m, an expression for m can be obtained. Although two expressions for m satisfying Formula (16) are obtained, $g(z)$ illustrated in FIG. 8C always gives a larger value out of these two expressions, and is expressed by the following Formula (17)

[Formula 17]

$$m = \frac{(2d_1 + R_{out})c_0 + R_{in}\sqrt{c_0^2 + (2d_1 + R_{out})^2 - R_{in}^2}}{(2d_1 + R_{out})^2 - R_{in}^2} \quad (17)$$

To summarize the above results, the minimum core diameter $c_x$ of the detection optical fiber 111 required to detect all beams of the signal light can be expressed by the following Formula (18).

[Formula 18]

$$c_x = \begin{cases} c_0 + 2(d_1 + d_2 + R_{out})\dfrac{NA}{\sqrt{1-NA^2}} & \left(-\dfrac{2NA}{\sqrt{1-NA^2}}\left(d_1 + \dfrac{R_{out}}{2}\right) + \dfrac{R_{in}}{\sqrt{1-NA^2}} > c_0\right) \\[1em] \dfrac{2NA}{\sqrt{1-NA^2}}\left(d_2 + \dfrac{R_{out}}{2}\right) + \dfrac{R_{in}}{\sqrt{1-NA^2}} & \left(-c_0 \leq -\dfrac{2NA}{\sqrt{1-NA^2}}\left(d_1 + \dfrac{R_{out}}{2}\right) + \dfrac{R_{in}}{\sqrt{1-NA^2}} \leq c_0\right) \\[1em] m(d_1 + d_2 + R_{out}) - \dfrac{c_0}{2} & \left(-\dfrac{2NA}{\sqrt{1-NA^2}}\left(d_1 + \dfrac{R_{out}}{2}\right) + \dfrac{R_{in}}{\sqrt{1-NA^2}} < -c_0\right) \end{cases} \quad (18)$$

As described above, the minimum core diameter $c_x$ and core diameter $c_y$ of the detection optical fiber 111 required to detect all beams of the signal light are different between the xz cross section and the yz cross section. Therefore, it is preferable that a core shape of the detection optical fiber 111 be ideally elliptical, but it is actually difficult to apply such an optical fiber because the optical fiber having the elliptical core shape is not generally distributed. Since $c_y > c_x$, it is possible to detect all beams of the signal light by setting the core diameter $c_1$ of the detection optical fiber 111 to $c_y$. In such a case, however, there is a high possibility that a signal-to-noise ratio (SNR) decreases due to detection of stray light or crosstalk light. Therefore, the core diameter $c_1$ of the detection optical fiber 111 preferably satisfies $c_x < c_1 < c_y$ in the present embodiment. Then, more light transmitted through the capillary 110 can be detected than that in a case where the core diameter $c_1$ of the detection optical fiber 111 is the same as that of the irradiation optical fiber 109, and the detection sensitivity is improved. Furthermore, at the same time, a detection amount of unnecessary light transmitted through a portion other than the inside of the capillary 110 can be reduced, and thus, the detection sensitivity is improved.

Figure 9:
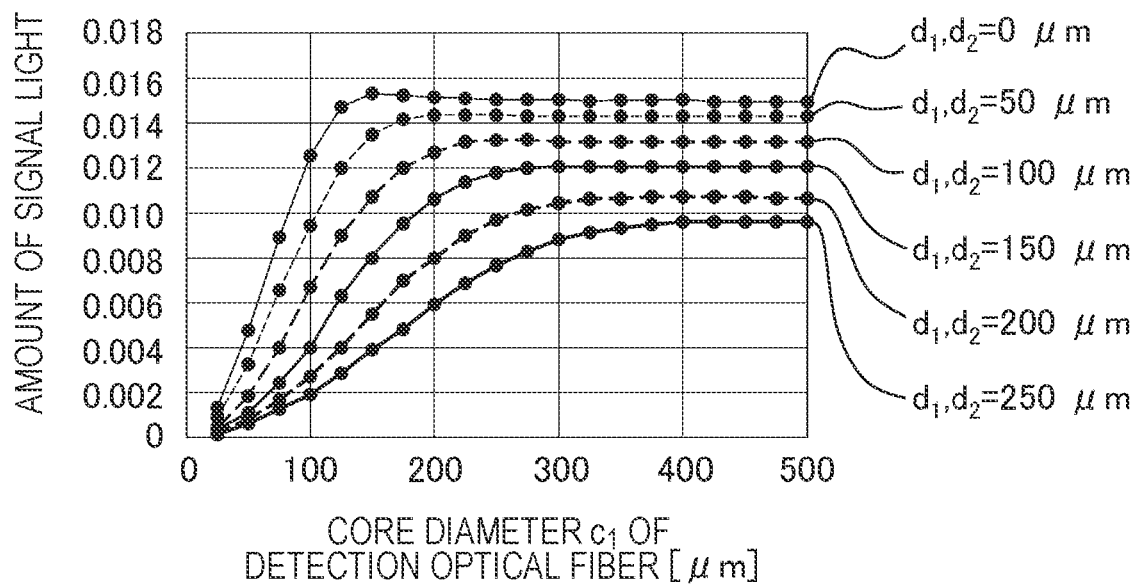
FIG. 9 is a graph illustrating an example of results of calculating a relationship between a core diameter of the detection optical fiber and the amount of signal light using a ray tracing simulation. In the drawing, the horizontal axis represents a core diameter $c_1$[μm] of the detection optical fiber, and the vertical axis represents the amount of signal light.

FIG. 9 is a graph illustrating an example of results of performing a ray tracing simulation using simulation software (Zemax OpticStudio 17.5) and calculating a relationship between the core diameter $c_1$ of the detection optical fiber 111 and the amount of signal light. The simulation was performed without using the lens 105 in the optical system illustrated in FIG. 2. That is, the simulation was performed with respect to light emitted to the corresponding capillary 110 by arranging the light-input-side end face of the bundle 106 at the image formation position of the light emitting surface of the light source 101 formed by the lens 102 and the lens 104 and coupling light to the irradiation optical fiber 109 arranged at the center of the bundle 106.

Conditions of the simulation were set as follows: the light source 101 has a Gaussian light emission intensity spatial distribution having a full width at half maximum of about 0.35 mm; a divergence angle of light from the light source 101 is ±20 degrees; a transmission wavelength of the band-pass filter 103 is 220 nm; focal lengths of the lens 102 and the lens 104 are both 21.5 mm; effective diameters of the lens 102 and the lens 104 are both 10 mm; a refractive index of the capillary 110 is 1.458; a refractive index inside the capillary 110 is 1.33; $c_0$=105 μm; $R_{in}$=50 μm; $R_{out}$=150 μm; and NA=0.25. This simulation was performed for $d_1$ and $d_2$=0 μm, 50 μm, 100 μm, 150 μm, 200 μm, and 250 μm. Note that $c_0$, $R_{in}$, $R_{out}$, NA, $d_1$, and $d_2$ have the same meanings as described above.

The vertical axis in FIG. 9 represents a value when a total light amount of light having a wavelength of 220 nm emitted from the light source 101 is 1. As illustrated in FIG. 9, it can be seen that the amount of signal light increases as the core diameter $c_1$ of the detection optical fiber 111 increases, but is saturated at a certain value or more regardless of $d_1$ or $d_2$.

Figure 10:
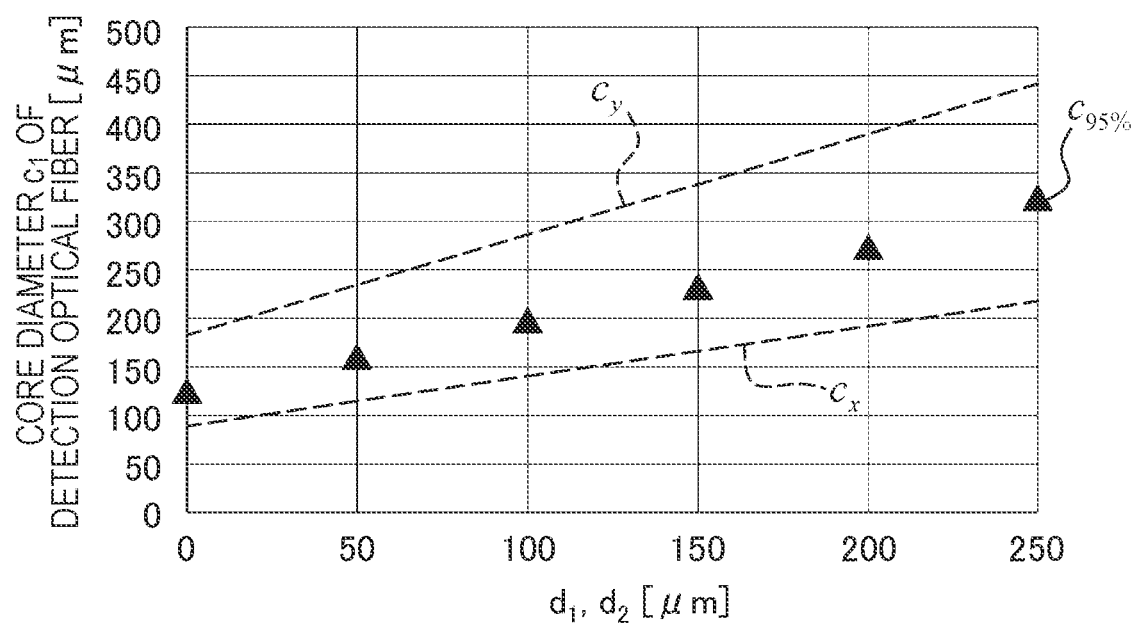
FIG. 10 is a graph illustrating results of plotting a minimum core diameter $c_{95\%}$ of the second optical fiber capable of detecting signal light at 95% or more of a saturation level calculated on the basis of the results of FIG. 9 with respect to $d_1$ and $d_2$ together with $c_x$ and $c_y$. In the drawing, the horizontal axis represents $d_1$ and $d_2$ [μm], and the vertical axis represents the core diameter $c_1$[μm] of the detection optical fiber.

FIG. 10 is a graph illustrating results of plotting a minimum core diameter $c_{95\%}$ of the detection optical fiber 111 capable of detecting signal light at 95% or more of a saturation level calculated on the basis of the results of FIG. 9 with respect to $d_1$ and $d_2$ together with $c_x$ and $c_y$. In the drawing, the minimum core diameter $c_{95\%}$ of the detection optical fiber 111 is indicated by "▲". Here, a value corresponding to a case where $-c_0 \leq 2f(-(d_1+R_{out}/2)) \leq c_0$ is used as $c_x$.

As can be seen from FIG. 10, the minimum core diameter $c_{95\%}$ of the detection optical fiber 111 capable of detecting most (95% or more) of the signal light exists between $c_x$ and $c_y$. For example, when $d_1$ and $d_2$=150 μm and the core diameter $c_1$ of the detection optical fiber 111 is set to 105 μm which is the same as the core diameter $c_0$ of the irradiation optical fiber 109, the amount of signal light is about 0.004 (FIG. 9). This is about 33% of a saturation level of 0.012 of the amount of signal light when the core diameter $c_1$ of the detection optical fiber 111 is set to a sufficiently large value. On the other hand, when the core diameter $c_1$ of the detection optical fiber 111 is set between $c_x$ (≈166 μm) and $c_y$ (≈337 μm), the amount of signal light is about 0.0096 to about 0.012 (FIG. 9). This is about 75% to 99.9% of the saturation level. In this manner, it is possible to detect more signal light than that in the case where the core diameter $c_1$ is the same as the core diameter $c_0$ of the irradiation optical fiber 109 by setting the core diameter $c_1$ of the detection optical fiber 111 between $c_x$ and $c_y$ ($c_x < c_1 < c_y$).

Figure 11:
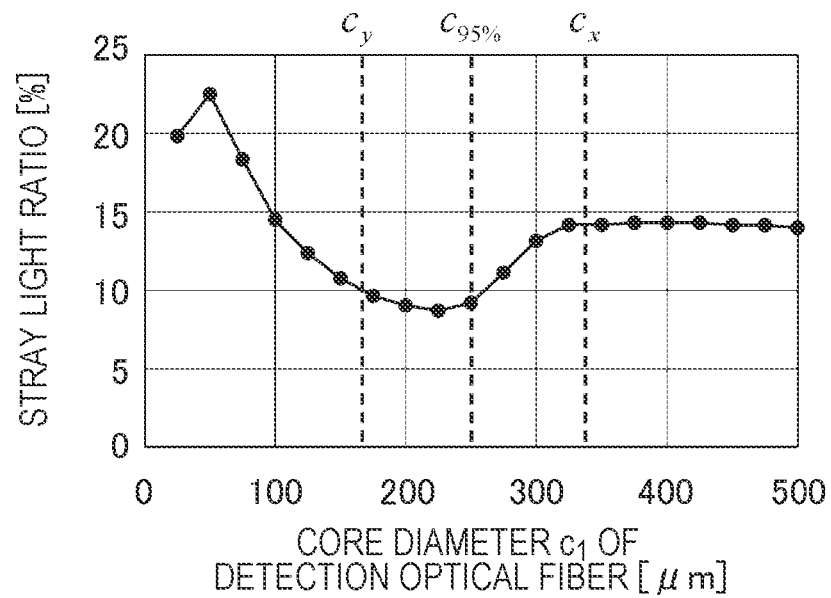
FIG. 11 is a graph illustrating results of simulating the dependence of a stray light ratio [%] on the core diameter of the detection optical fiber when $d_1$ and $d_2$=150 μm. In the drawing, the horizontal axis represents the core diameter $c_1$ [μm] of the detection optical fiber, and the vertical axis represents the stray light ratio [%].

FIG. 11 is a graph illustrating results of calculating the dependence of a stray light ratio [%] on the core diameter $c_1$ of the detection optical fiber 111 when $d_1$ and $d_2$=150 μm using simulation software (Zemax OpticStudio 17.5). Note that the stray light ratio refers to a ratio of the amount of stray light to the total amount of light coupled to the detection optical fiber 111 in the present specification. As illustrated in FIG. 11, it can be seen that the stray light ratio decreases almost monotonically as the core diameter $c_1$ increases until the core diameter $c_1$ is about 200 μm, decreases slightly until the core diameter $c_1$ reaches about 225 μm, but turns to increase when the core diameter $c_1$ is 225 μm or more. This means that an energy density of the signal light is higher than an energy density of the stray light in a circular region having a diameter of 225 μm or less, and this magnitude relationship is reversed in a region having a diameter of 225 μm or more. Therefore, when $d_1$ and $d_2$=150 μm and noise of the light intensity is more dominant than noise of the detector 112, the SNR decreases as the stray light ratio increases, and thus, the optimum core diameter $c_1$ of the detection optical fiber 111 is 225 μm. Furthermore, it can be seen that the optimum core diameter $c_1$ also exists between $c_x$ and $c_y$ ($c_x < c_1 < c_y$) from the viewpoint of the stray light ratio as illustrated by a dotted line in FIG. 11.

From the above results, when the core diameter $c_1$ of the detection optical fiber 111 is set between $c_x$ and $c_y$, more signal light can be detected than that in the case where the same core diameter as that of the irradiation optical fiber 109 is set. Furthermore, it is possible to reduce the stray light ratio and the crosstalk as compared with a case where the core diameter is set to be $c_y$ or more by setting the core diameter $c_1$ of the detection optical fiber 111 between $c_x$ and $c_y$, and thus, a high detection sensitivity can be obtained.

Figure 12:
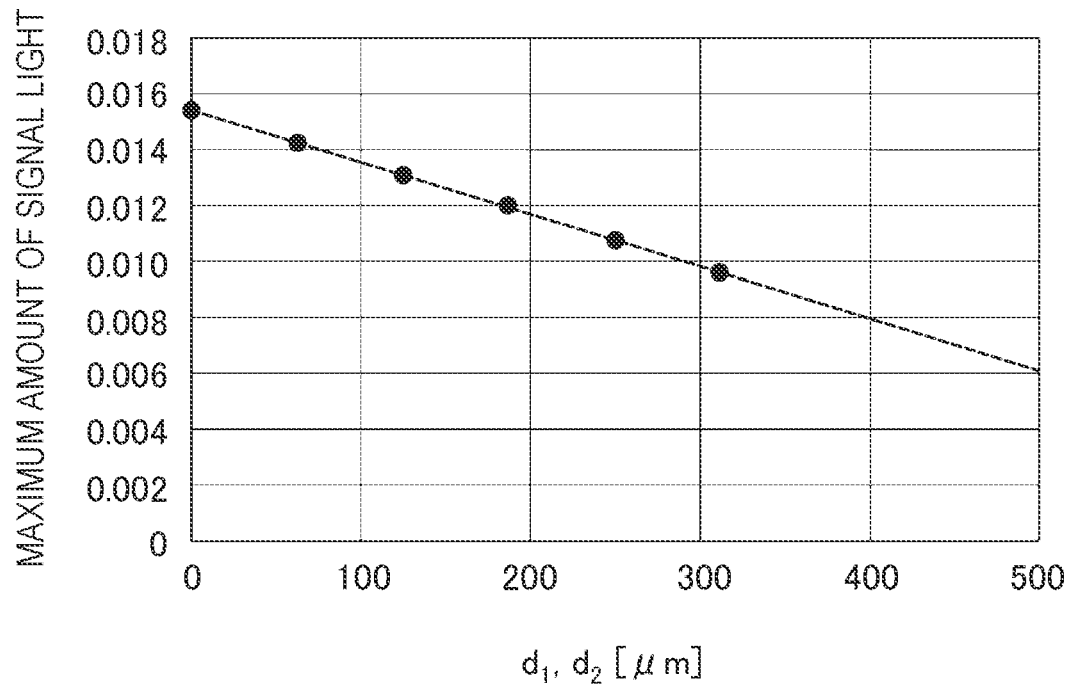
FIG. 12 is a graph illustrating results of plotting the amount of signal light (maximum amount of signal light) obtained in a case where the core diameter $c_1$ of the detection optical fiber is sufficiently increased with respect to $d_1$ and $d_2$ ($d_1=d_2$). In the drawing, the horizontal axis represents $d_1$ and $d_2$ [μm], and the vertical axis represents the maximum amount of signal light.

FIG. 12 is a graph illustrating results of plotting the amount of signal light (maximum amount of signal light) obtained in a case where the core diameter $c_1$ of the detection optical fiber 111 is sufficiently increased with respect to $d_1$ and $d_2$ ($d_1$=$d_2$). Since the maximum amount of signal light increases as $d_1$ and $d_2$ decrease, it is desirable to make $d_1$ and $d_2$ as small as possible from the viewpoint of the performance. However, it is appropriate to set $d_1$ and $d_2$ to about several tens to several hundred μm in practice in order to avoid damage and performance deterioration of components caused by contact between the components.

(Suitable Conditions for Obtaining Predetermined Sensitivity)

Next, a suitable amount of signal light for obtaining a predetermined sensitivity in the present embodiment will be defined, and conditions suitable for obtaining this amount of signal light will be described. A typical example of a UV absorption optical system 130 for one capillary 131 illustrated in FIG. 13 will be considered in order to determine a reference value of the amount of signal light. A light emitting surface of a deuterium lamp 132, which is a light source, forms an image at a position of the capillary 131 by an imaging optical system $L_3$ including two lenses $L_1$ and $L_2$. Note that a slit 133 is arranged between the lens $L_2$ and the capillary 131 and in the vicinity of the capillary 131, and a part of light transmitted through the slit 133 is emitted to the capillary 131. At this time, only a wavelength component used for measurement is cut out by a band-pass filter 134 provided between the two lenses $L_1$ and $L_2$. A part of light transmitted through the capillary 131 is coupled to an optical fiber bundle 135 and detected by a photodiode 136 which is a detector. The slit 133 plays a role of preventing light from being emitted to a portion other than the inside of the capillary 131 as much as possible, and a role of limiting a light irradiation region width in a length direction of the capillary 131 to define resolution.

In the UV absorption optical system 130, the amount of the light transmitted through the inside of the capillary 131 increases as a magnification of the imaging optical system is lowered to reduce a spot size of the light with which the capillary 131 is irradiated. However, an upper limit of the amount of light coupled to the optical fiber bundle 135 to be finally detected is determined by a numerical aperture $NA_f$ of an optical fiber. Therefore, it is sufficient that a numerical aperture of the lens $L_2$ is about $NA_f$ and the amount of detected light hardly increases even if the numerical aperture is made larger than $NA_f$. From this, it can be said that using the same lens having the numerical aperture $NA_f$ to perform equal-magnification imaging is the most inexpensive and simplest configuration that maximizes the amount of irradiation light. Therefore, in the present embodiment, the amount of signal light obtained at the time of equal-magnification imaging in the UV absorption optical system 130 illustrated in FIG. 13 is defined as a reference value $P_c$ of the amount of signal light required to achieve the predetermined sensitivity.

Figure 13:
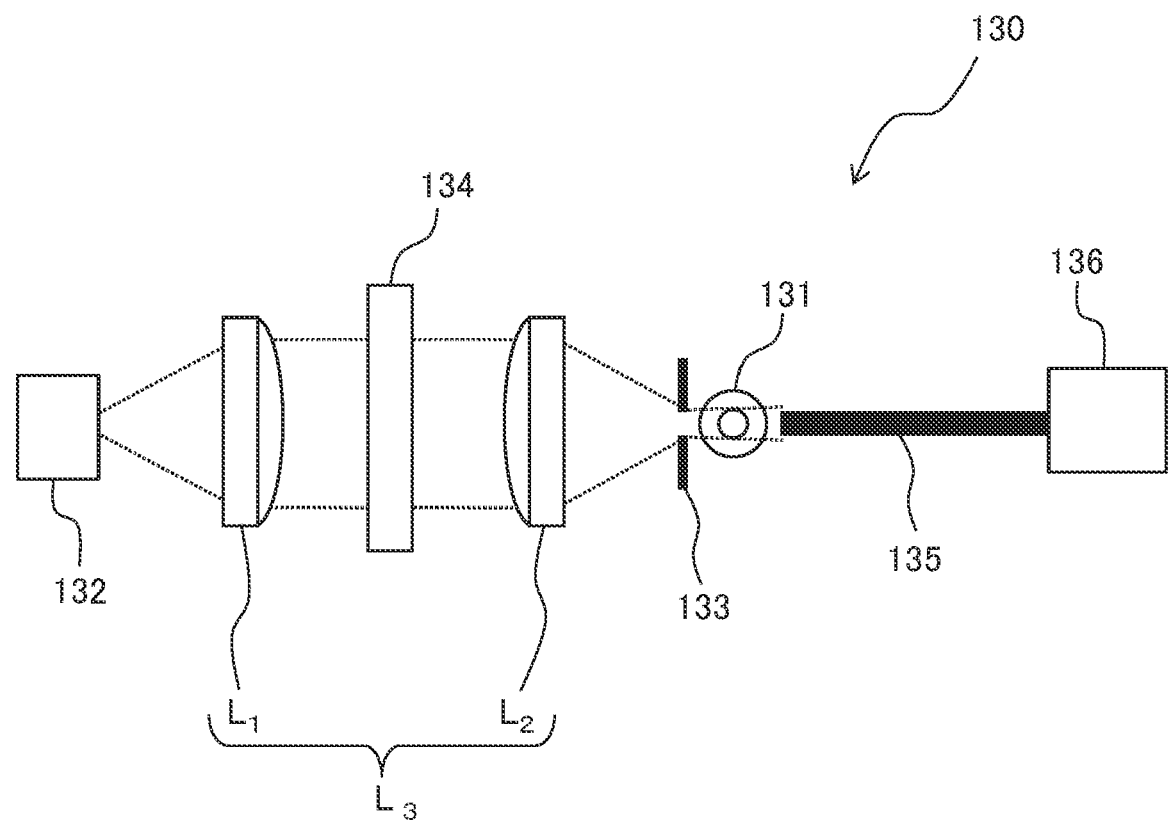
FIG. 13 is a schematic diagram illustrating a typical example of a UV absorption optical system for one capillary.

A ray tracing simulation was performed using simulation software (Zemax OpticStudio 17.5) assuming typical conditions, and the amount of signal light obtained in the UV absorption optical system 130 illustrated in FIG. 13 was evaluated. As a result, the obtained amount of signal light was about 1% of the total light amount of measurement wavelength components emitted from the deuterium lamp 132 which is the light source. Note that it was assumed that seven optical fibers each having a core diameter of 320 µm are arranged in a range of a diameter of 1 mm in the optical fiber bundle 135 as the simulation condition. Therefore, a width of the slit 133 in the length direction of the capillary 131 was set to 200 µm, and a width of the slit 133 in a direction perpendicular to the length direction of the capillary 131 was set to 100 µm. Conditions regarding the light source (deuterium lamp 132), the lenses $L_1$ and $L_2$, and the band-pass filter 134 are the same as the conditions for obtaining the results of FIG. 9. Assuming that there is an error, caused by a difference between the simulation and an actual device or fluctuations of the total light emission amount of the light source for each product, at about 20%, the reference value $P_c$ is set to 0.8%. The reference value $P_c$ can be interpreted as a typical value of the amount of signal light obtained in the UV absorption optical system 130 including the typical single capillary.

An example of conditions suitable for making the amount of signal light larger than 0.8% which is the reference value $P_c$ in the present embodiment will be described. From the results of FIG. 9, it can be seen that the core diameter $c_1$ of the detection optical fiber 111 that achieves the amount of signal light of 0.8% or more when $d_1$ and $d_2$=0 µm in which the amount of signal light is the largest is about 60 µm or more. Therefore, it can be said that the core diameter $c_1$ of the detection optical fiber 111 is preferably at least 60 µm or more. Furthermore, from the results illustrated in FIG. 12, it can be said that each of $d_1$ and $d_2$ is preferably about 300 µm or less in order to achieve the amount of signal light of 0.8% or more. With the configuration that satisfies these conditions, the predetermined sensitivity can be more reliably achieved.

Second Embodiment

Heretofore, the present embodiment has been described as a representative case where the UV absorption measurement is performed. The present embodiment can also be applied to NF measurement and LIF measurement, for example, by inserting a long-pass filter, which blocks an excitation wavelength component and transmits a fluorescence wavelength, in front of the detector 112 such as a photodiode. Hereinafter, as a second embodiment, the capillary electrophoresis device 1 capable of performing UV absorption measurement and LIF measurement with the same device will be described.

Figure 14:
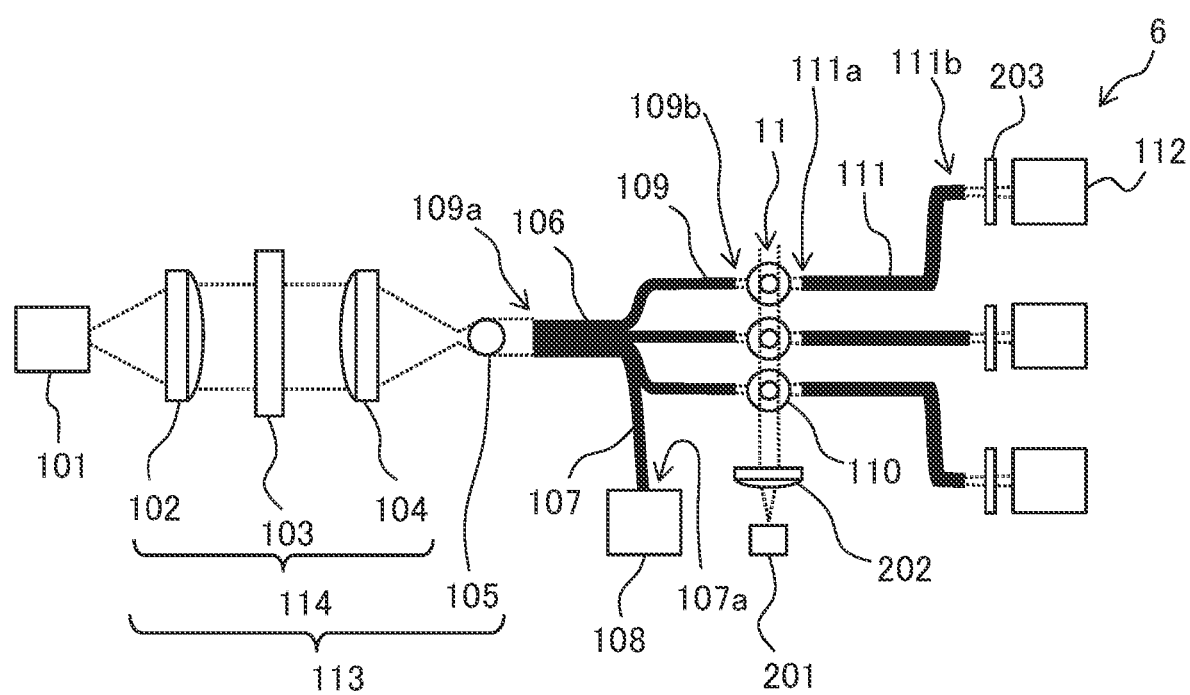
FIG. 14 is a schematic diagram illustrating another aspect of a detection unit in a capillary electrophoresis device according to a second embodiment.

FIG. 14 is a schematic diagram illustrating another aspect of the detection unit 6 in the capillary electrophoresis device 1 according to the second embodiment. Note that, in FIG. 14, what is the same as the constituent element illustrated in FIG. 2 will be denoted by the same reference sign, and the description thereof will be omitted. As illustrated in FIG. 14, the second embodiment is different from the first embodiment in that a second light source (light source 201) for fluorescence measurement (NF or LIF), a lens 202, and a detachable long-pass filter 203 are provided close to the capillaries 110. The lens 202 is, for example, a collimating lens, and serves as a light irradiation unit that converts excitation light from the light source 201 into collimated light and irradiates the plurality of capillaries 110 with the collimated light.

As illustrated in FIG. 14, an irradiation direction of light with respect to the plurality of capillaries 110 by the lens 202 is set to be perpendicular to both an irradiation direction of light with respect to the capillary 110 by the plurality of the irradiation optical fibers 109 and a length direction of the capillary 110 in the detection unit 6 according to the second embodiment. Furthermore, the irradiation of the plurality of capillaries 110 with light by the lens 202 is set so as to pass through the inside of the capillaries 110.

With such a configuration, the excitation light emitted from the light source 201 is converted into the collimated light by the lens 202 in the detection unit 6 in the second embodiment. Further, the collimated light is incident on the capillary array 11 in an array direction of the capillaries 110. As a result, it is possible to collectively irradiate the plurality of capillaries 110 with the excitation light using the single light source 201. When a sample moving inside the capillary 110 is irradiated with the excitation light, fluorescence (autofluorescence or fluorescence from a fluorescent dye) is generated from the sample. Further, a part of the generated fluorescence is coupled to the detection optical fiber 111. The fluorescence propagated through the detection optical fiber 111 passes through the long-pass filter 203 and is detected by the detector 112. The long-pass filter 203 plays a role of blocking the excitation light scattered by the capillary 110 and coupled to the detection optical fiber 111. Furthermore, the long-pass filter 203 is detachable, and is removed when the UV absorption measurement is performed and is installed when the fluorescence measurement is performed.

As described above, the description of the capillary electrophoresis device 1 according to the second embodiment is omitted, but the capillary electrophoresis device 1 according to the second embodiment operates similarly to that of the first embodiment to perform the UV absorption measurement based on the light source 101. Further, the capillary electrophoresis device 1 according to the second embodiment performs the LIF measurement at the same time.

At this time, in the second embodiment, the excitation light transmitted through the capillary 110 is not directly incident on the detection optical fiber 111 as compared with a case where the light source 101 of the first embodiment is used as an excitation light source. Therefore, the capillary electrophoresis device 1 according to the second embodiment can suppress the amount of excitation light coupled to the detection optical fiber 111. This makes it possible to perform the fluorescence measurement with a higher sensitivity.

Third Embodiment

Figure 15:
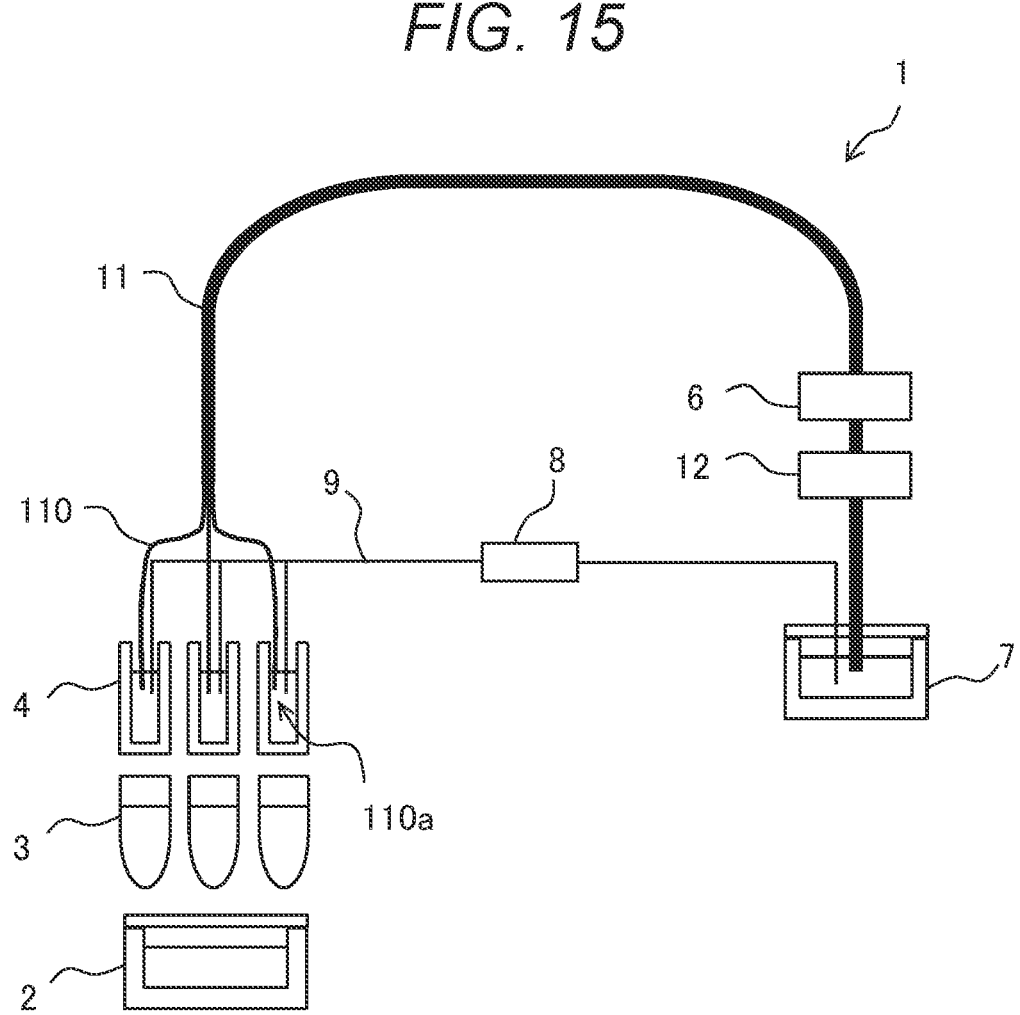
FIG. 15 is a schematic diagram illustrating a configuration example of a capillary electrophoresis device according to a third embodiment.

FIG. 15 is a schematic diagram illustrating a configuration example of the capillary electrophoresis device 1 according to a third embodiment. Note that, in FIG. 15, what is the same as the constituent element illustrated in FIG. 1 will be denoted by the same reference sign, and the description thereof will be omitted. As illustrated in FIG. 15, the third embodiment is different from the first embodiment in that a detection unit 12 for fluorescence measurement is further provided on the downstream of the detection unit 6 for UV absorption measurement for electrophoresis of a sample. Note that the detection unit 6 has the configuration illustrated in FIG. 2. Hereinafter, the configuration of the detection unit 12 will be described.

Figure 16:
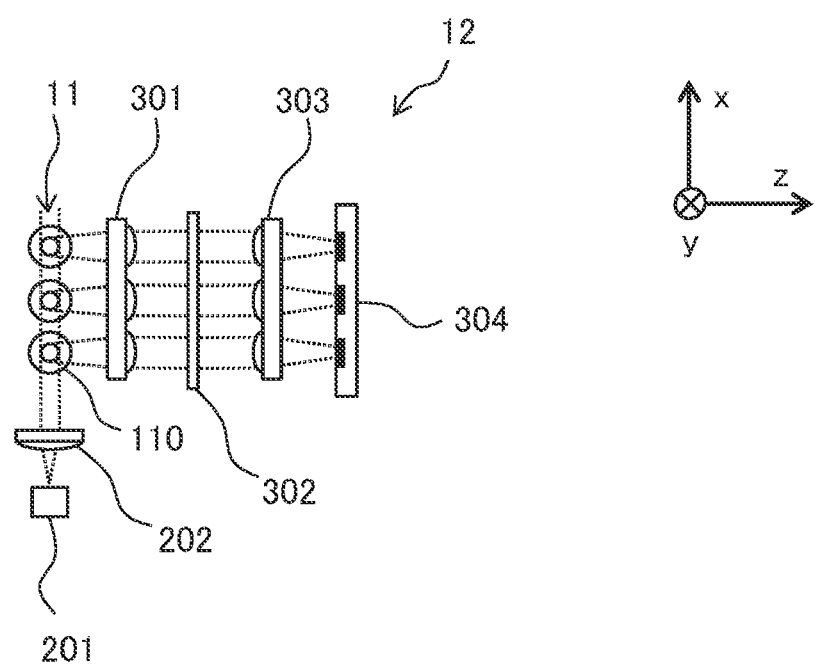
FIG. 16 is a schematic diagram illustrating a configuration example of a detection unit for fluorescence measurement of the capillary electrophoresis device according to the third embodiment.

FIG. 16 is a schematic diagram illustrating a configuration example of the detection unit 12 for fluorescence measurement of the capillary electrophoresis device 1 according to the third embodiment.

As illustrated in FIG. 16, in the detection unit 12 for fluorescence measurement in the third embodiment, an irradiation direction of light with respect to the plurality of capillaries 110 by the lens 202 is set to be perpendicular to both an irradiation direction of light with respect to the capillary 110 by the plurality of irradiation optical fibers 109 (not illustrated in FIG. 16) and a length direction of the capillary 110. Furthermore, the irradiation of the plurality of capillaries 110 with light by the lens 202 is set so as to pass through the inside of the capillaries 110.

With such a configuration, in the detection unit 12, excitation light emitted from the light source 201 is converted into collimated light by the lens 202 as in the second embodiment as illustrated in FIG. 16. Further, the collimated light is incident on the capillary array 11 in an array direction of the capillaries 110. Fluorescence generated from the sample in the capillaries 110 is converted into collimated light by a lens array 301. Further, the collimated light passes through the long-pass filter 302, is collected by a lens array 303, and is detected by a photodiode array 304 which is a detector.

In the third embodiment, the lens array 301 and the lens array 303 are used as means for guiding the fluorescence to the photodiode array 304. It is easy to increase a numerical aperture of the lens as compared with an optical fiber. Therefore, in the third embodiment, more fluorescence can be detected as compared with the second embodiment, and a higher detection sensitivity can be obtained.

Furthermore, the detection unit 6 for UV absorption measurement and the detection unit 12 for fluorescence measurement are provided at different portions of the capillary array 11 in the third embodiment as illustrated in FIG. 15. In this manner, an array pitch pi of the capillary array 11 can be individually optimized for each measurement mode between the detection units 6 and 12.

Furthermore, the array pitch pi of the capillary array 11 can be made equal in the respective measurement modes in the detection units 6 and 12. Then, a section for adjusting the array pitch pi between the detection unit 6 and the detection unit 12 becomes unnecessary, and thus, a distance between the detection unit 6 and the detection unit 12 can be reduced. Therefore, electrophoresis conditions (for example, electrophoresis distances) in both the measurement modes can be brought close to each other. Furthermore, a size of the device can be reduced.

Fourth Embodiment

Figure 17:
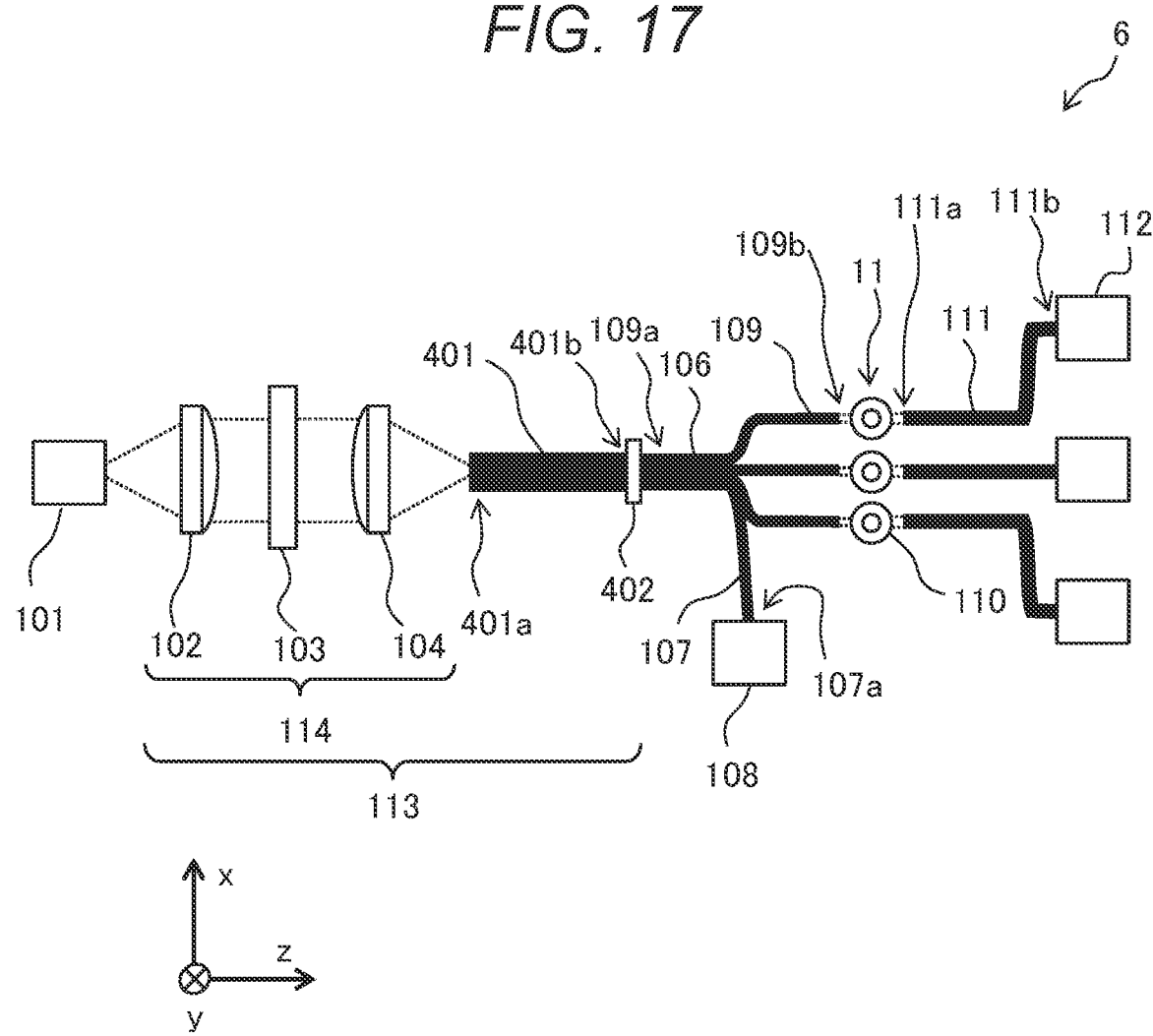
FIG. 17 is a schematic diagram illustrating another aspect of a detection unit in a capillary electrophoresis device according to a fourth embodiment.

FIG. 17 is a schematic diagram illustrating another aspect of the detection unit 6 in the capillary electrophoresis device 1 according to a fourth embodiment. Note that, in FIG. 17, what is the same as the constituent element illustrated in FIG. 2 will be denoted by the same reference sign, and the description thereof will be omitted. As illustrated in FIG. 17, the fourth embodiment is different from the first embodiment in that the lens 105 is not provided in the imaging optical system 114, and instead, the connection optical fiber 401 ("third optical fiber" in the claims) and an optical fiber adapter 402 are provided. Here, the optical fiber adapter 402 is a member configured to directly connect the connection optical fiber 401 and the irradiation optical fiber 109, and is not interposed as an inclusion on a propagation path of light like a lens. That is, the optical fiber adapter 402 has no influence on light to be propagated. When the optical fiber adapter 402 connects the connection optical fiber 401 and the irradiation optical fiber 109, light propagated through the connection optical fiber 401 is directly propagated (directly connected) to the irradiation optical fiber 109.

An input-side end face (one end face 401a) of the connection optical fiber 401 is arranged at an image formation position of a light emitting surface of the light source 101 by the imaging optical system 114. In other words, the one end face 401a is arranged at a position where the amount of light coupled to the connection optical fiber 401 is maximized. On the other hand, an output-side end face (the other end face 401b) of the connection optical fiber 401 is directly connected to a light-input-side end face (the one end face 109a) of the bundle 106 by the optical fiber adapter 402. As a result, light from the light source 101 is coupled to the connection optical fiber 401, propagated through the connection optical fiber 401, and then coupled to the bundle 106, and divided into the number of the irradiation optical fibers 109 included in the bundle 106.

In such a configuration, since a differential coefficient of the amount of light coupled to the connection optical fiber 401 with respect to a position of the one end face 401a is zero, it is possible to reduce a fluctuation in the amount of coupled light caused by a variation in the position of the one end face 401a. This is based on the same reason for the fact that the fluctuation in the amount of light coupled to the irradiation optical fiber 109 arranged at the center of the bundle (r=0 μm) is small even in the case where the Koehler illumination is not used in the first embodiment (the case where the imaging optical system is used) as illustrated in FIG. 5B.

Moreover, the other end face 401b and the one end face 109a are integrated by the optical fiber adapter 402, and thus, a relative positional relationship therebetween hardly changes. Therefore, in the fourth embodiment, it is possible to suppress the fluctuation in the amount of light coupled to the irradiation optical fiber 109 included in the bundle 106 caused by a variation in a component position and to prevent a decrease in a detection sensitivity.

Note that it is desirable that a core diameter of the connection optical fiber 401 be relatively larger than a core diameter of the bundle 106 including the irradiation optical fibers 109. A method of dividing light by directly connecting the bundle 106 including one connection optical fiber 401 having a relatively large core diameter and the irradiation optical fibers 109 each having a relatively small core diameter as described above can be implemented with a simple and inexpensive configuration as compared with a method using a beam splitter, a fiber splitter, a waveguide, a diffraction grating, or the like, which contributes to downsizing and cost reduction of the device. Furthermore, an energy density of light (energy of light per unit area) does not decrease due to the division, and thus, there are advantages that the energy density of light at the position where the capillaries 110 are irradiated with light can be kept high and the detection sensitivity can be increased.

It is desirable that the core diameter of the connection optical fiber 401 be larger than the effective core diameter ECD (diameter of the minimum enclosing circle of the core 109c portions of the plurality of irradiation optical fibers 109 included in bundle 106) of the bundle 106 illustrated in FIGS. 3A to 3C. As a result, light can be evenly divided into the plurality of irradiation optical fibers 109, and the detection unit 6 can uniformize measurement conditions for all the capillaries 110.

Although the capillary electrophoresis device according to the present invention has been described in detail with reference to the embodiments, a gist of the present invention is not limited thereto, and various modifications are included. For example, the above-described embodiments have been described in detail in order to describe the present invention in an easily understandable manner, and are not necessarily limited to one including the entire configuration that has been described above. Furthermore, configurations of another embodiment can be substituted for some configurations of a certain embodiment, and in addition, a configuration of another embodiment can be added to a configuration of a certain embodiment. Furthermore, addition, deletion or substitution of other configurations can be made with respect to some configurations of each embodiment.

REFERENCE SIGNS LIST 1 capillary electrophoresis device
2 electrophoretic medium container
3 sample container
4 injection-side electrode bath
6, 12 detection unit
7 discharge-side electrode bath
8 high-voltage power supply
9 electrode
11 capillary array
101 light source
102, 104, 105 lens
103 band-pass filter
106 bundle (optical fiber bundle)
106a center
107 reference light optical fiber
107a end face
108, 112 detector
109 irradiation optical fiber (first optical fiber)
109a, 109b end face
109c core
109d cladding
109e center
110 capillary
110a end face
111 detection optical fiber (second optical fiber)
111a, 111b end face
113 optical coupling optical system
114 imaging optical system
115 positioning array substrate
115a groove
201 light source
202 lens
203 long-pass filter
301, 303 lens array
302 long-pass filter
304 photodiode array
401 connection optical fiber (third optical fiber)
D beam diameter
L distance (distance from center of minimum enclosing circle of bundle of plurality of irradiation optical fibers (first optical fibers) to center of outermost peripheral optical fiber)
$L_3$ imaging optical system
$L_1$, $L_2$ lens
$c_0'$ cladding diameter
$c_0$ core diameter (irradiation optical fiber (first optical fiber))
$c_1$ core diameter (detection optical fiber (second optical fiber))
$c_{95\%}$ minimum core diameter
$c_y$, $c_x$ core diameter
pi array pitch
r distance (distance from center of bundle)

The invention claimed is:

1. A capillary electrophoresis device comprising:
a plurality of capillaries into which a sample to be measured is configured to be introduced and electrically separated;
a light source that generates light for analyzing the sample electrically separated by the plurality of capillaries;
a detector that detects light transmitted through the capillaries;
an optical coupling optical system and a plurality of first optical fibers provided between the light source and the plurality of capillaries; and
a plurality of second optical fibers provided between the plurality of capillaries and the detector,
wherein the optical coupling optical system couples the light from the light source to the plurality of first optical fibers,
wherein each of the plurality of first optical fibers has a first end face connected to the optical coupling optical system, and a second end face arranged close to and opposite to a corresponding capillary among the capillaries,
wherein each of the plurality of second optical fibers has a first end face arranged close to and opposite to a corresponding capillary among the capillaries, and a second end face connected to the detector,
wherein the optical coupling optical system includes an imaging optical system and a third optical fiber, and
wherein the third optical fiber has a first end face arranged at an image formation position of a light emitting surface of the light source formed by the imaging optical system, and a second end face directly connected to the plurality of first optical fibers.

2. The capillary electrophoresis device according to claim 1,
wherein a core diameter of the second optical fibers is larger than a core diameter of the first optical fibers.

3. The capillary electrophoresis device according to claim 1, wherein
a core diameter $c_1$ of the second optical fibers satisfies the following Formula (1):

[Formula 1]

$$c_x < c_1 < c_y \tag{1}$$

wherein in Formula 1, $c_0$ is a core diameter of the first optical fibers, a distance between the second end face of the first optical fiber and the capillary is $d_1$, a distance between the first end face of the second optical fiber and the capillary is $d_2$, a numerical aperture of the first optical fiber is NA, an inner diameter of the capillary is $R_{in}$, and an outer diameter of the capillary is $R_{out}$, $c_x$ and $c_y$ are given as follows:

$$c_x = \begin{cases} c_0 + 2(d_1 + d_2 + R_{out})\dfrac{NA}{\sqrt{1-NA^2}} & \left(-\dfrac{2NA}{\sqrt{1-NA^2}}\left(d_1 + \dfrac{R_{out}}{2}\right) + \dfrac{R_{in}}{\sqrt{1-NA^2}} > c_0\right) \\ \dfrac{2NA}{\sqrt{1-NA^2}}\left(d_2 + \dfrac{R_{out}}{2}\right) + \dfrac{R_{in}}{\sqrt{1-NA^2}} & \left(-c_0 \leq -\dfrac{2NA}{\sqrt{1-NA^2}}\left(d_1 + \dfrac{R_{out}}{2}\right) + \dfrac{R_{in}}{\sqrt{1-NA^2}} \leq c_0\right) \\ m(d_1 + d_2 + R_{out}) - \dfrac{c_0}{2} & \left(-\dfrac{2NA}{\sqrt{1-NA^2}}\left(d_1 + \dfrac{R_{out}}{2}\right) + \dfrac{R_{in}}{\sqrt{1-NA^2}} < -c_0\right) \end{cases}$$

$$c_y = c_0 + 2(d_1 + d_2 + R_{out})\dfrac{NA}{\sqrt{1-NA^2}}$$

and m is given as follows:

$$m = \dfrac{(2d_1 + R_{out})c_0 + R_{in}\sqrt{c_0^2 + (2d_1 + R_{out})^2 - R_{in}^2}}{(2d_1 + R_{out})^2 - R_{in}^2}$$

4. The capillary electrophoresis device according to claim 1, wherein
the optical coupling optical system uniformizes a spatial light intensity distribution of the light source to perform the coupling to the plurality of first optical fibers.

5. The capillary electrophoresis device according to claim 1, wherein
the optical coupling optical system includes an imaging optical system and at least one lens, and
a focal position or a combined focal position of the at least one lens coincides with an image formation position of a light emitting surface of the light source formed by the imaging optical system.

6. The capillary electrophoresis device according to claim 1,
wherein the first end faces of the plurality of first optical fibers are bound to form a bundle, and
wherein a core diameter of the third optical fiber is larger than a diameter of a circle enclosing cores of the plurality of optical fibers included in the bundle.

7. The capillary electrophoresis device according to claim 1, wherein
at least one optical fiber among plurality of first optical fibers has a first end face connected to the optical coupling optical system and a second end face connected to a detector for reference light.

8. The capillary electrophoresis device according to claim 1, wherein
in the plurality of first optical fibers, the second end faces arranged close to and to correspond to the plurality of capillaries are provided at an array pitch pi satisfying the following Formula (2):

[Formula 2]

$$pi > \dfrac{c_0 + c_1}{2} + (d_1 + d_2 + R_{out})\dfrac{NA}{\sqrt{1-NA^2}} \qquad (2)$$

wherein in Formula (2), $c_0$ is a core diameter of the first optical fiber, $c_1$ is a core diameter of the second optical fiber, $d_1$ is a distance between the second end face of the first optical fiber and the capillary, $d_2$ is a distance between the first end face of the second optical fiber and the capillary, $R_{out}$ is an outer diameter of the capillary, and NA is a numerical aperture of the first optical fiber.

9. The capillary electrophoresis device according to claim 1, wherein
at least one of the plurality of capillaries, the plurality of first optical fibers, or the plurality of second optical fibers is positioned one by one by a plurality of grooves of a positioning array substrate including the grooves, and
positions of the grooves coincide with each other when a plurality of the positioning array substrates is provided.

10. The capillary electrophoresis device according to claim 1, further comprising:
a second light source; and
a light irradiation unit that irradiates the plurality of capillaries with light from the second light source,
wherein an irradiation direction of the light with respect to the plurality of capillaries by the light irradiation unit is perpendicular to both an irradiation direction of light with respect to the capillaries by the plurality of first optical fibers and a length direction of the capillary.

11. The capillary electrophoresis device according to claim 1, wherein
a core diameter of the second optical fiber is 60 μm or more.

12. The capillary electrophoresis device according to claim 1, wherein
when a distance between the second end face of the first optical fiber and the capillary is $d_1$ and a distance between the first end face of the second optical fiber and the capillary is $d_2$, $d_1 \leq 300$ μm and $d_2 \leq 300$ μm.

\* \* \* \* \*